May 27, 1941.  E. E. SMITH  2,243,321
SELF-ADJUSTING GEAR SHIFTING MECHANISM
Filed Nov. 22, 1937   8 Sheets-Sheet 4
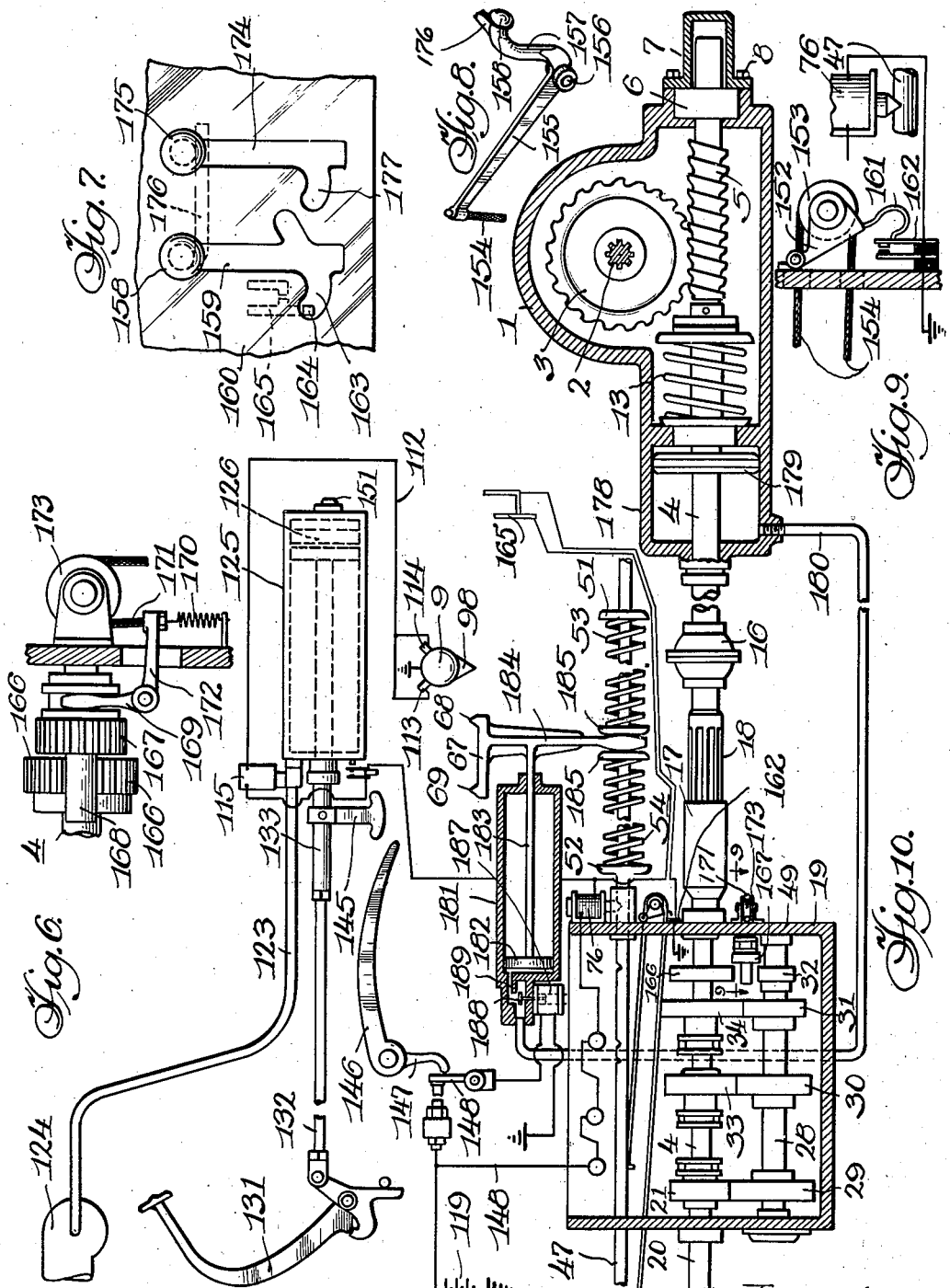
Witness:
Chas. L. Koursh
Inventor
By Elwood E. Smith,
Parkinson + Lane, Attys.

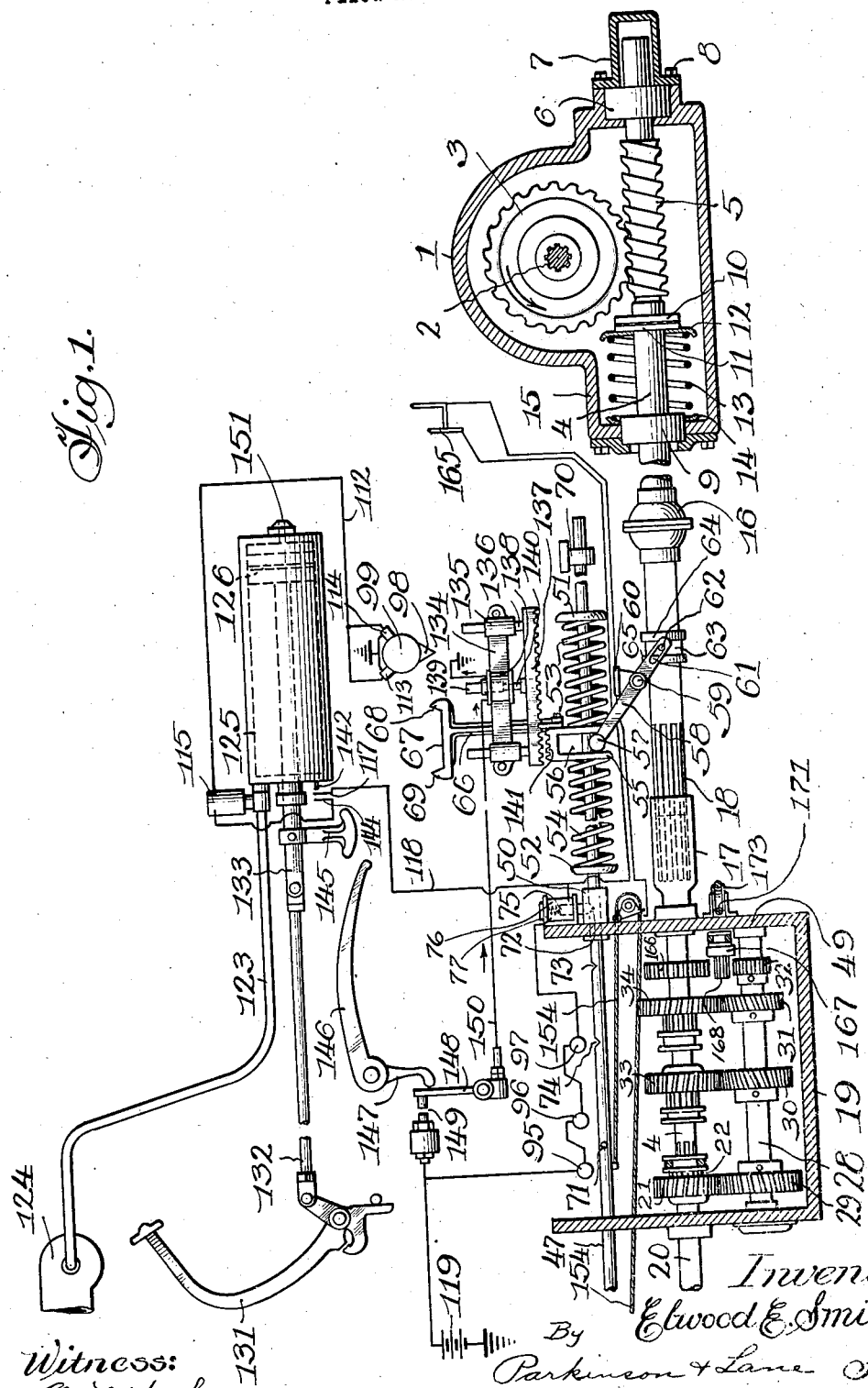

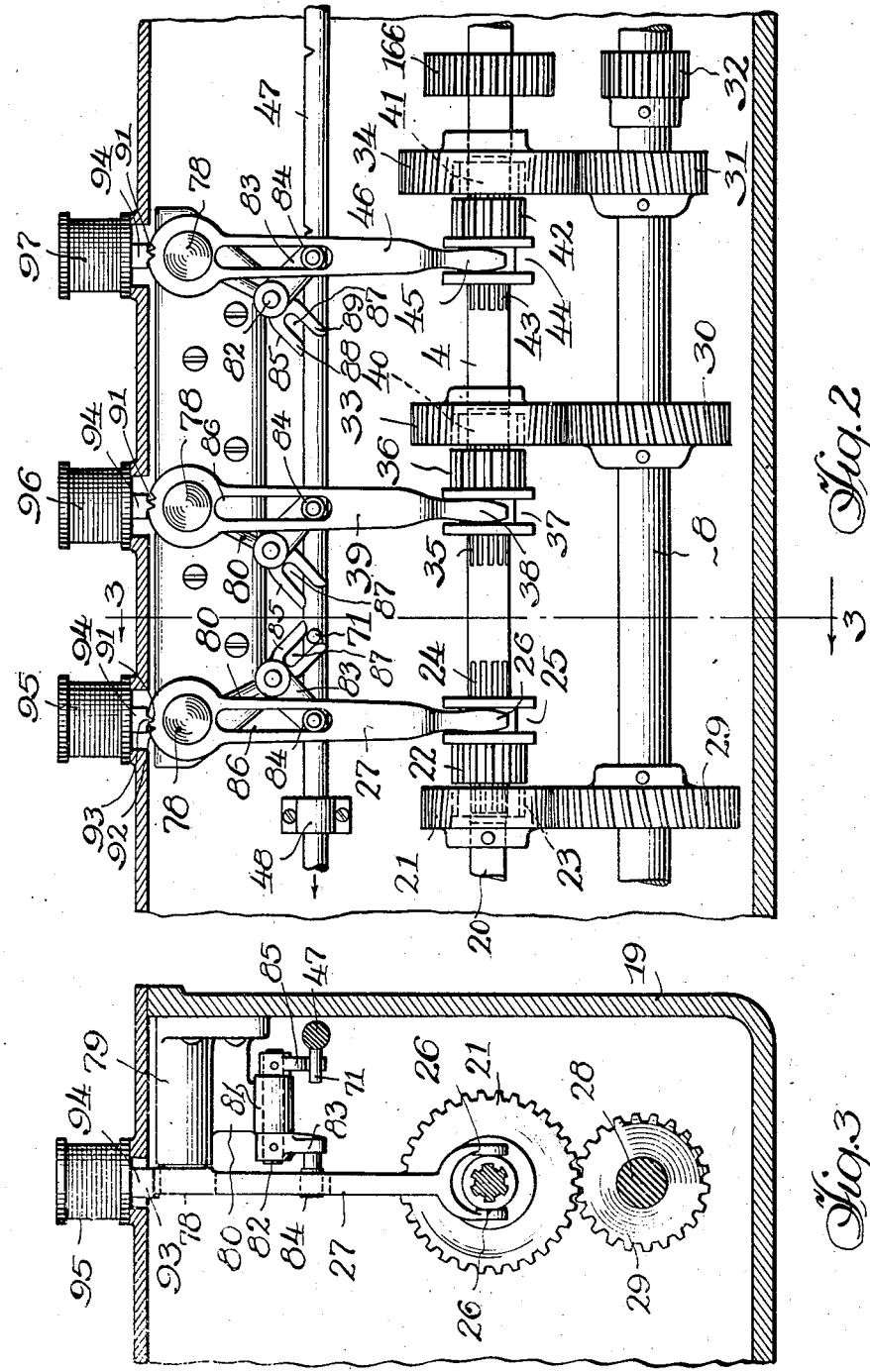

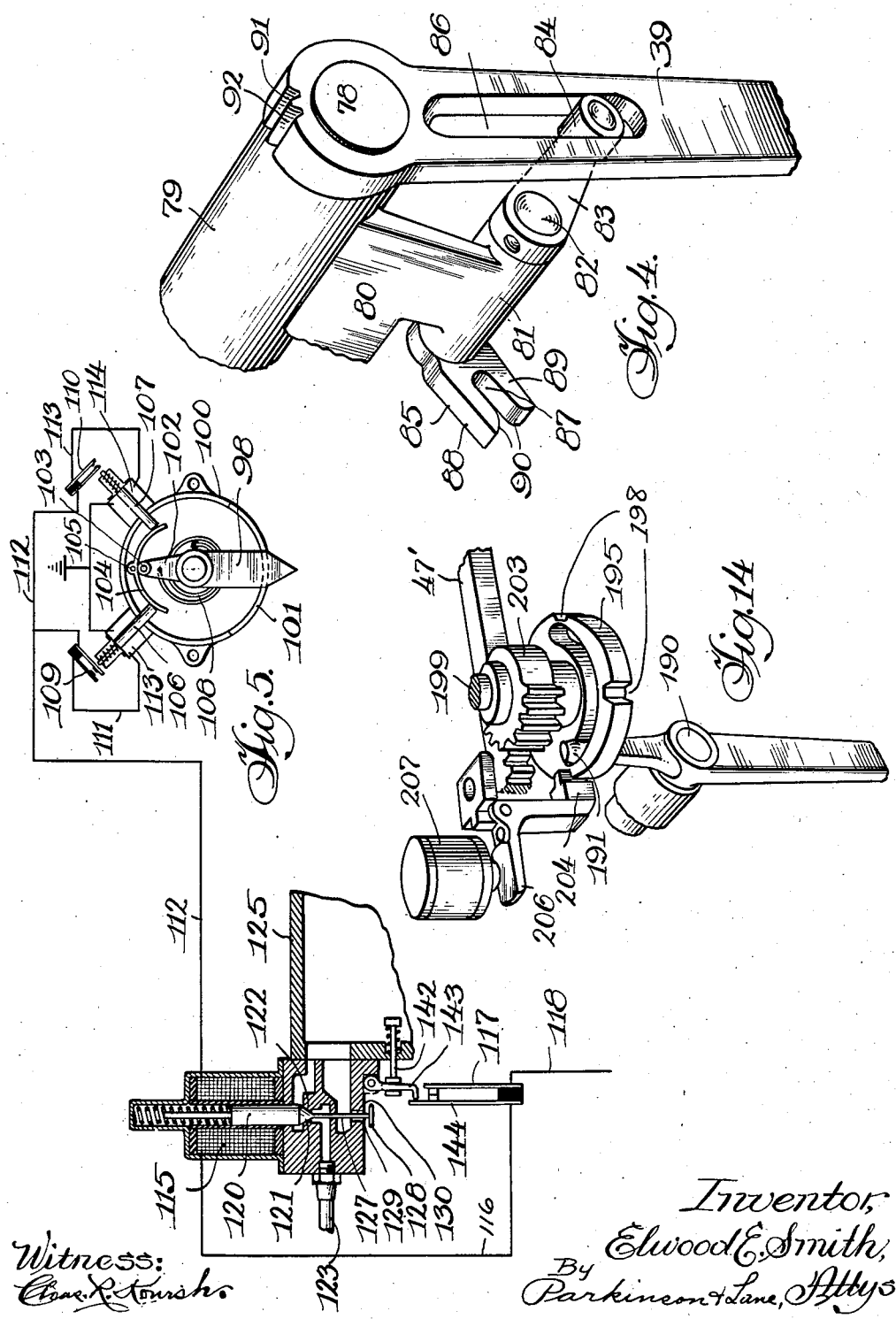

May 27, 1941.  E. E. SMITH  2,243,321

SELF-ADJUSTING GEAR SHIFTING MECHANISM

Filed Nov. 22, 1937  8 Sheets-Sheet 5

Witness:
Chas. L. Koursh

Inventor,
By Elwood E. Smith,
Parkinson + Lane, Attys.

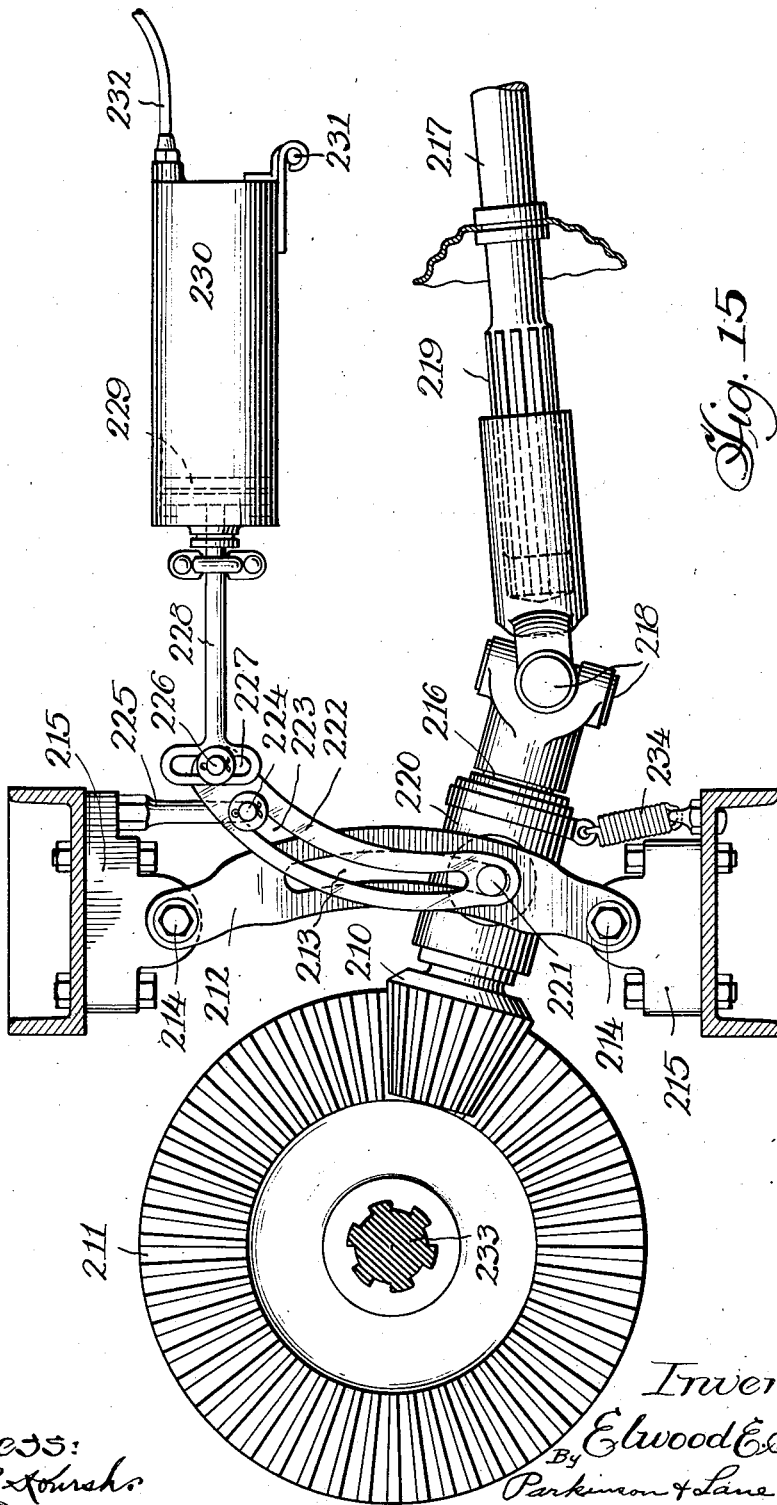

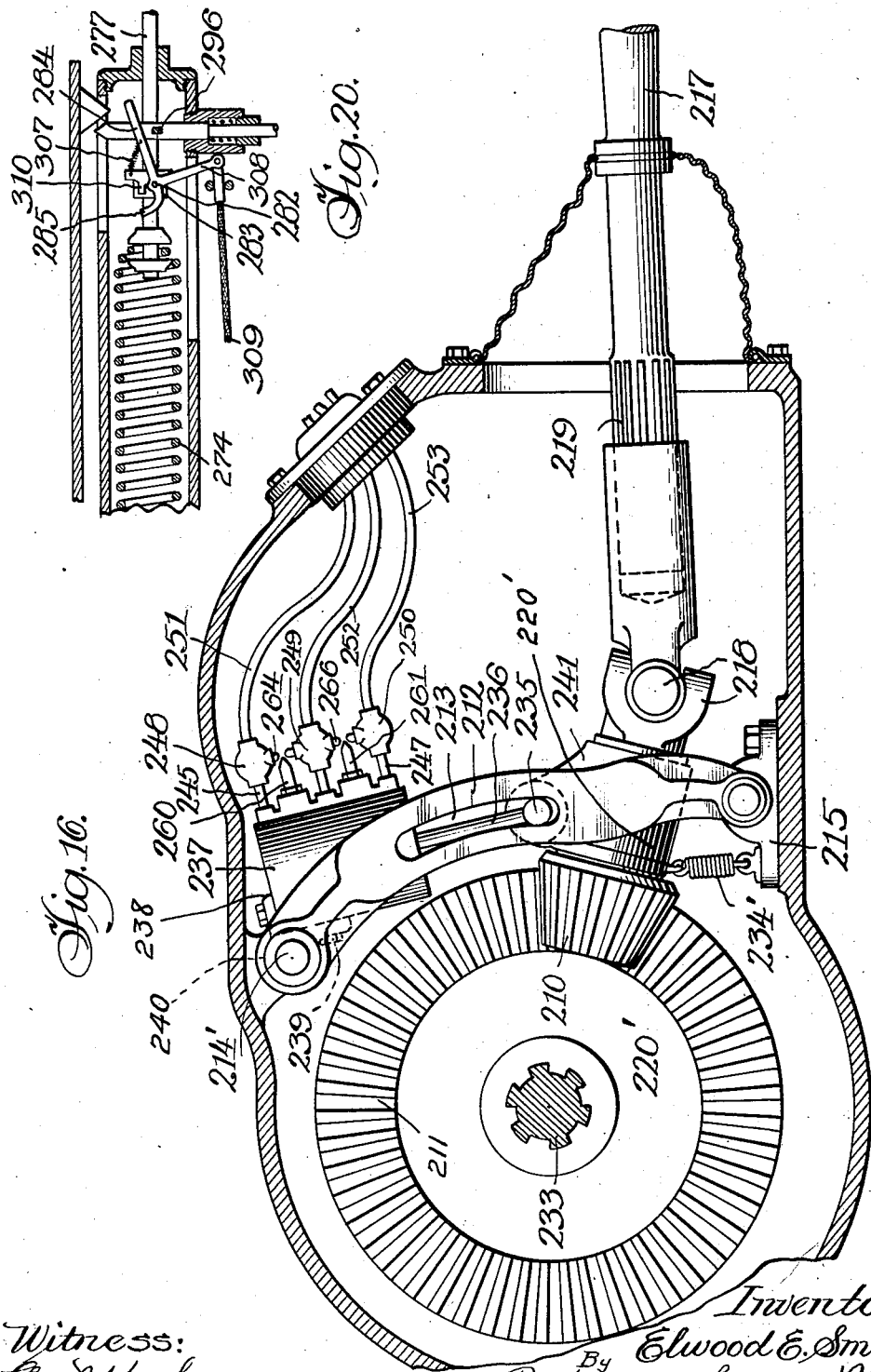

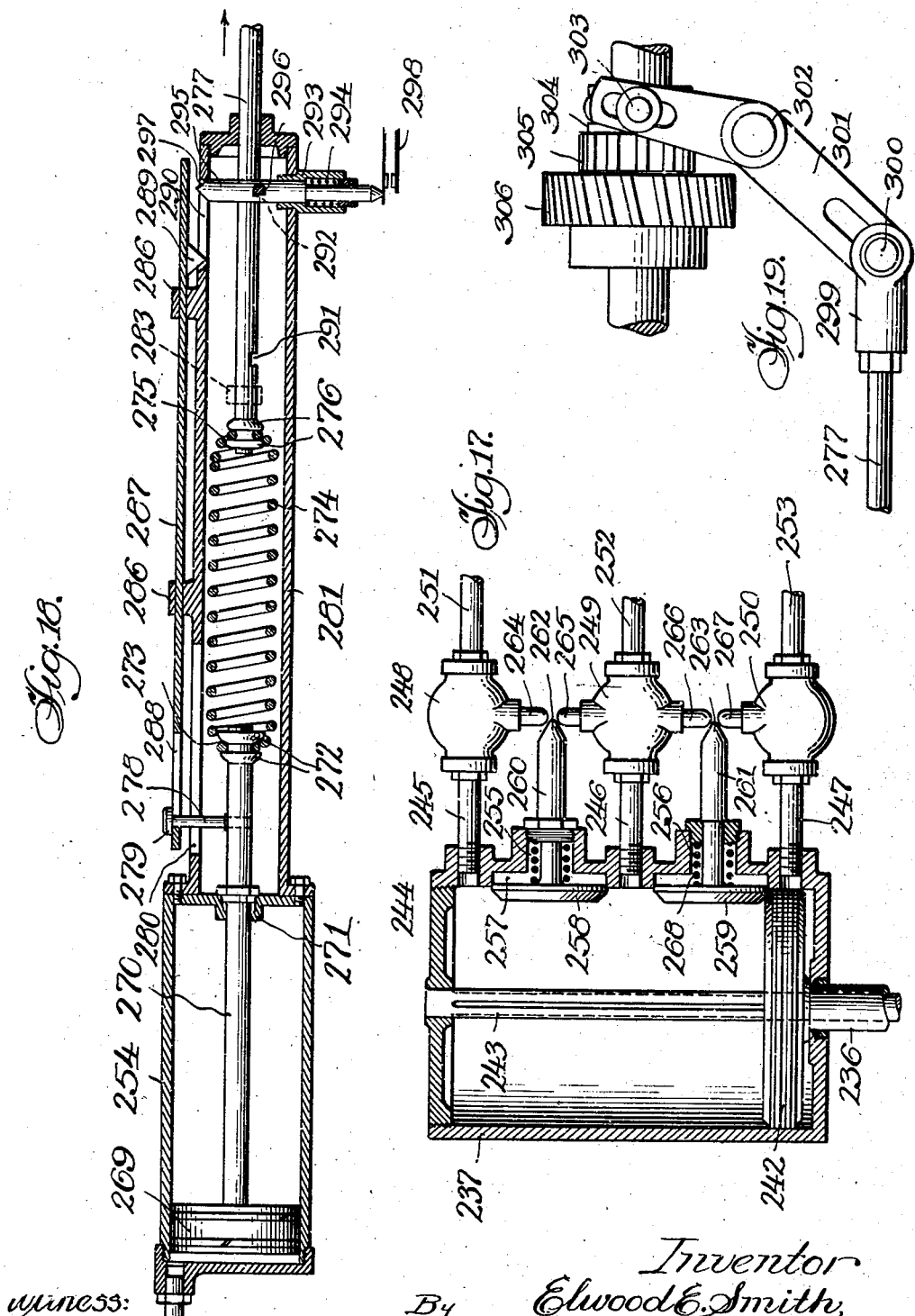

Patented May 27, 1941

2,243,321

UNITED STATES PATENT OFFICE 2,243,321

SELF-ADJUSTING GEAR SHIFTING MECHANISM

Elwood E. Smith, Chicago, Ill.

Application November 22, 1937, Serial No. 175,899

29 Claims. (Cl. 192—3.5)

This invention relates to gear shifting mechanism and more particularly such mechanism that will automatically adjust itself to variations in the driven load resulting from the operation of an automobile or other mechanism in which my invention is adaptable.

An object of my invention is the provision of self-adjusting gear shifting mechanism in which substantially all of the parts and operations conform to accepted practices in automotive engineering, an outstanding feature of my invention consisting in the utilizing of the variation in the load resistance as an activating force to move the parts so as to adjust the regular gears of standard type transmission to the greatest advantage without necessity of control by the driver.

Another object of my invention is to effect the gear shifting by energy stored up from longitudinal movement of a portion of the drive shaft, and providing locking means to prevent the dissipation of such stored up energy when the clutch is released to permit the shifting to take place.

A further object is to provide novel locking means in connection with the gear shifting mechanism to prevent any shifting movement while energy is being stored up by the longitudinal movement of a portion of the drive shaft.

A still further object is to provide means whereby the stored up energy can be released only at the proper time so as to permit the actual shifting of the gears without mechanical interference or clashing.

Another object of my invention is to provide novel means for automatically effecting the unlocking of said locking means at the proper time.

A further object is to provide a proper timing of the various operations of the parts for controlling and effecting the shifting of the gears so that the various steps of the operation will occur in proper sequence without interference with each other.

A still further object is to provide a novel arrangement of parts in the differential housing to effect longitudinal movement of the drive shaft upon change in back pressure due to resistance of the driven load against the driving force of the drive shaft, and to translate this longitudinal movement of the drive shaft into automatic shifting of the gears to accommodate the varying load conditions.

Another object is the provision of a longitudinally moving shifting rod and novel mechanism for translating movement of said rod to the selective shifting of the gears.

A further object is to provide a longitudinally movable shifting rod and means associated therewith whereby the gears may be selectively shifted in one direction upon movement of the shifting rod in one direction, and selectively shifted in the opposite direction upon movement of the shifting rod in the opposite direction.

A further object is to provide novel neutral mechanism which will temporarily disconnect the regular controlling devices and position the shifting rod so that when the neutral device is released the gears will first be shifted into low to accommodate the heavier load attendant upon starting up the car.

Another object of my invention is to provide self-adjusting gear shifting mechanism having economy of space, simplicity of parts and operations, and capable of efficient transmission of power and ease of servicing after installation.

Other objects, advantages and capabilities inherent in my invention will later become more readily apparent.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 1 is a general diagrammatic layout of self-adjusting gear shifting mechanism embodying my invention, some of the parts being shown in vertical longitudinal section, some in elevation and some in distorted position for the sake of convenience.

Fig. 2 is a fragmentary vertical section through a portion of the gear casing, most of the parts being shown in elevation, and showing the mechanism for selectively transmitting the longitudinal movement of the shifting rod to the shifting of the gears.

Fig. 3 is a fragmentary vertical transverse section on the line 3—3 of Fig. 2 and looking in the direction of the arrows.

Fig. 4 is a fragmentary perspective detail of one of the devices for selectively shifting the gears from the longitudinal movement of the shifting rod.

Fig. 5 is a diagrammatic view of the trip switch which controls the circuit for operating the various locking devices and the valve of the vacuum cylinder of the clutch release, and also showing in section a portion of the vacuum cylinder and its associated control parts.

Fig. 6 is a detail elevation of the mechanism for shifting the reverse gear.

Fig. 7 is a fragmentary front elevation of a portion of a panel of the instrument board showing slots and portions of the neutral and reverse levers operating therein.

Fig. 8 is a fragmentary perspective detail of the neutral lever and associated parts.

Fig. 9 is a fragmentary sectional view of a portion of the gear casing and the hinged pulley over which the neutral cable operates, with associated parts for automatically closing the circuit which controls the unlocking of the shifting rod and the unlocking of parts of the gear shifting mechanism.

Fig. 10 is a view similar to Fig. 1 but showing a modified form of my invention.

Fig. 14 is a perspective detail of the rack bar, one of the mutilated gears and associated parts of the mechanism shown in Figs. 11 and 13 for transmitting longitudinal motion of the rack bar shifting rod to the selective shifting of the gears.

Fig. 15 is a side elevation partly in section of a further modification in my invention.

Fig. 16 is a fragmentary vertical longitudinal section with parts shown in elevation of another modification of my invention.

Fig. 17 is a vertical longitudinal section of a hydraulic cylinder operated by the mechanism shown in Fig. 16.

Fig. 18 is a vertical longitudinal section through one of the gear shifting cylinders and associated parts used in connection with the modification of Fig. 16.

Fig. 19 is a detail elevation of the shifting gears and operating parts used in connection with the structure shown in Fig. 18.

Fig. 20 is a fragmentary sectional detail of mechanism for placing the gears in neutral.

Figure 12:
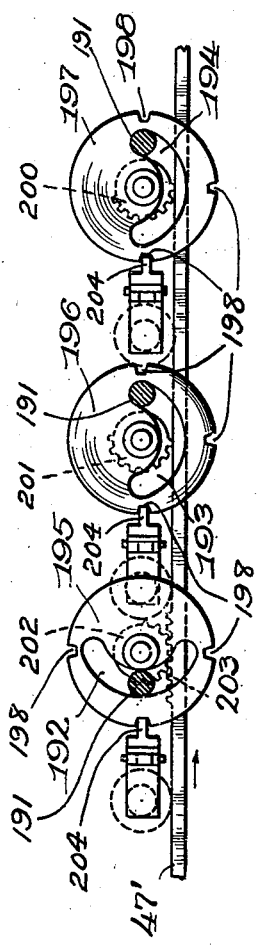
Fig. 12 is a horizontal section on the line 12—12 of Fig. 11 looking in the direction of the arrows.
Figure 11:
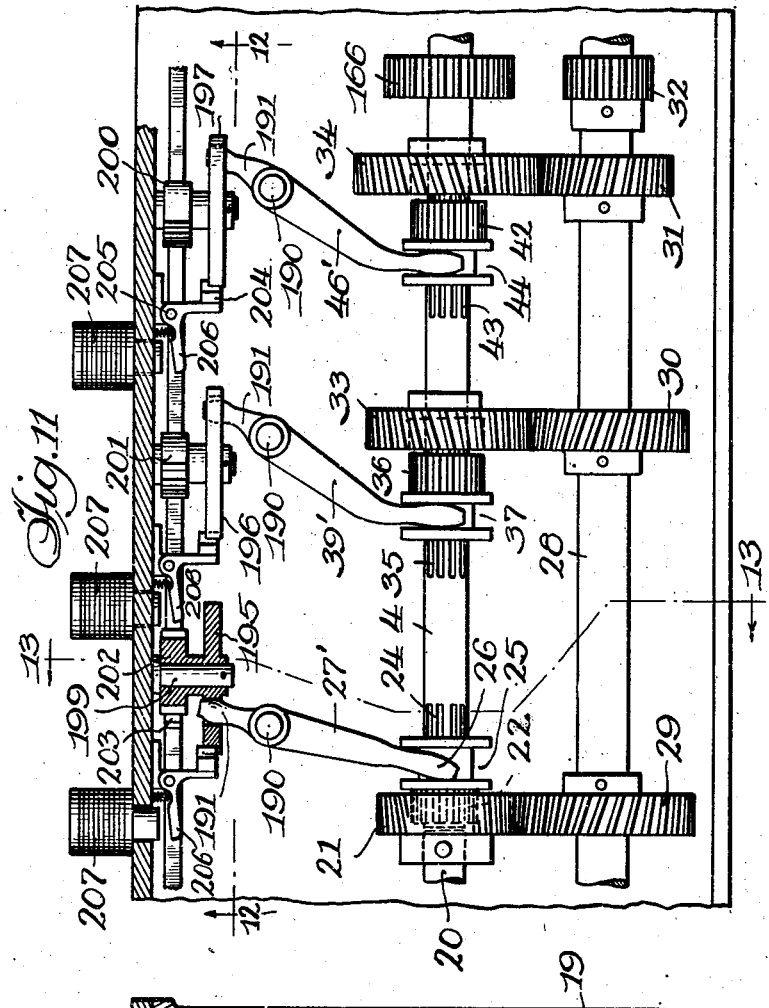
Fig. 11 is a view similar to Fig. 2 but showing a modified form of mechanism for transmitting movement of the shifting rod to the selective shifting of the gears.
Figure 13:
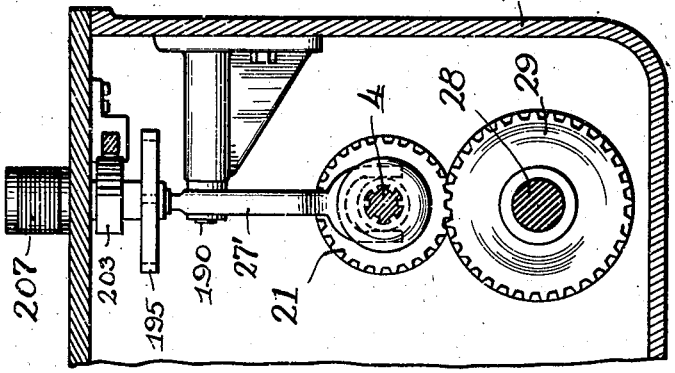
Fig. 13 is a fragmentary vertical section on the line 13—13 of Fig. 11 looking in the direction of the arrows.

Referring in detail to the drawings and more particularly Fig. 1, positioned in the usual manner within the differential housing 1 is the rear axle shaft 2 to which is keyed the worm gear 3, which worm gear replaces the usual ring gear. Rotatably mounted in the differential housing 1 is the rear end of the drive shaft 4, upon which is fixed the worm 5 which drives the worm gear 3 in a manner that will be readily understood. The rear end of drive shaft 4 is rotatably mounted in a bearing member 6, which will be provided with suitable anti-friction means. The free end of drive shaft 4 is enclosed by the cap member 7 secured by bolts 8 to an extension of the differential housing. As will be noted in Fig. 1, the free end of drive shaft 4 extends beyond bearing 6 and is mounted for longitudinal movement in said bearing, the interior of cap member 7 being of a size to permit any necessary longitudinal movement of this shaft.

On the opposite side of differential housing 1 and in alignment with bearing 6, is a bearing member 9 similar in construction to bearing member 6 and also permitting longitudinal sliding movement therein of drive shaft 4. Fixed to drive shaft 4 closely adjacent the front end of worm 5 is a thrust bearing 10, against the forward face of which is the complemental half 11 of the thrust bearing, there being provided between the adjacent faces of the thrust bearing members 10 and 11 suitable anti-friction devices such as balls, rollers or the like. Cup plate 12 is held against thrust bearing member 11 by means of a coil spring or main spring 13, which latter tends to move drive shaft 4 to the right as viewed in Fig. 1, the opposite end of spring 13 bearing against a cup plate 14 which in turn seats against the adjacent inner face of the end of the hollow extension 15 of the differential housing. A universal joint 16 is provided in drive shaft 4 which is of the usual construction in automobile practice.

The drive shaft 4 is also provided with a telescopic spline connection 17 having internal splines formed therein, with which slidably cooperate complemental splines 18 to permit a longitudinal movement and corresponding lengthening or shortening of the drive shaft to accommodate longitudinal movement of the latter, as will be later more fully described. Ahead of the spline member 17 of drive shaft 4 is the transmission housing 19, in which is journalled on one side the forward end portion of the drive shaft 4 and in the opposite side in alignment therewith the end portion of the engine shaft 20, so that the engine shaft and drive shaft will form a continuous coaxial shaft. The rear end of engine shaft 20 has fixed thereto to rotate therewith the spur gear 21, which is formed in its rear face and coaxial with the engine shaft and drive shaft with a toothed cavity adapted to receive corresponding teeth on the clutch member 22 of the standard type as used in American automobiles of the present day, this clutch member being the one, as will be more fully understood later, for transmitting high speed to the drive wheels of the car.

As will be seen in Fig. 2, the rear end of the engine shaft 20 and the forward end of the drive shaft 4 are separate and distinct from each other but closely adjacent. In other words, the rear end of engine shaft 20 terminates within high gear 21 or a suitable hub formed on the same if desired, but stops considerably short of the rear face of gear 21 to permit entry into the hollow toothed opening thereof of the forward end of drive shaft 4. As will be understood, this permits engine shaft 20 and drive shaft 4 to rotate at different speeds with relation to each other, and when required in opposite directions with relation to each other. It should also here be kept in mind that the structure described above permits when desired the high speed clutch member 22 to be moved into engagement with the internal teeth 23 formed in the hollow interior of spur gear 21, so that drive shaft 4 may be directly connected with and driven at the same speed as engine shaft 20. The longitudinal movement of clutch member 22 is made possible by suitable longitudinally extending splines 24 formed in drive shaft 4 and at a length to permit the desired amount of movement.

The rear end of clutch member 22 is formed with a circumferential groove 25 within which is seated the arms 26 of the bifurcated end of shifting lever 27, which is caused to move by associated parts hereinafter more fully explained. Rotatably mounted in the front and rear walls of the transmission housing 19 and spaced a suitable distance laterally from engine shaft 20 and drive shaft 4, is the idler shaft 28 to which are fixed the spur gears 29, 30, 31 and 32. Spur gear 29, as seen in Fig. 2, meshes in permanent engagement with spur gear 21 so that idler shaft 28 is always rotating with engine shaft 20 when the engine is running. Spur gear 30 is in constant meshing engagement with spur gear 33, which latter is rotatably mounted on drive shaft 4 so that it will not be rotated thereby except when the intermediate gear mechanism is connected therewith, as later more fully explained. Spur gear 31 is in constant meshing engagement with spur gear 34, which like gear 33 is rotatably mounted with relation to drive shaft 4 except when the low gear driving mechanism is connected therewith, as later explained.

Splined by means of a plurality of splines 35 to drive shaft 4 is the clutch member 36 formed with the circumferential groove 37, in which are seated a pair of arms 38 formed on the free end of a shifting lever 39 similar to shifting lever 27 and operated as later described. It should here be pointed out that spur gear 33 is formed with a hollow interior having spur clutch teeth complemental to and for receiving in driving engagement the spur teeth of clutch member 36 when the latter is moved into the toothed hollow interior 40 of spur gear 33.

Spur gear 34 is formed on its interior with a hollow circumferentially toothed portion 41, in which are adapted to engage the spur teeth of clutch member 42, splined by means of splines 43 to drive shaft 4, said clutch member also being formed with a circumferential groove 44 within which are seated arms 45 of the shifting lever 46, which is operated in a manner similar to shifting levers 27 and 39, as later explained. From this it is seen that each of spur gears 21, 33 and 34 are formed with a hollow toothed interior, the teeth of which are complemental to and slidably receive the teeth of clutch members 22, 36 and 42, when the latter are selectively moved into engagement with the former as later explained.

Slidably mounted in the front and rear end walls of transmission housing 19, as seen in Figs. 1, 2 and 3, is a shifting rod 47 which, if desired, may also be slidably mounted in any desirable number of brackets or supports 48, and extends through the rear end wall 49 of the transmission housing and a substantial distance to the rear of the same. Rear end wall 49 is formed with a boss 50 apertured to slidably receive shifting rod 47. Secured to shifting rod 47 at suitably spaced points are the cup plates 51 and 52, which receive the adjacent ends of coil springs 53 and 54, respectively. Slidably mounted upon or straddling shifting rod 47 is the yoke member 55 having the vertically slotted guideway 56 which slidably receives for vertical movement therein the roller or the like 57 carried by the upper end of shifting arm 58 fulcrumed at 59 to a stationary support 60. The lower end of lever 58 is extended downwardly beyond fulcrum 59 and formed with a longitudinally extending slot 61 which receives a pin 62 carried by sleeve 63 loosely mounted on drive shaft 4 between collars 64 and 65, fixed to the drive shaft. Longitudinal movement of the drive shaft 4 forwardly as viewed in Fig. 1, will cause arm 58 to swing about fulcrum 59 in a clockwise direction and compress spring 53 between yoke 55 and cup plate 51 as later more fully described. Fixed to yoke 55 and extending upwardly therefrom is the trip arm 66 formed at its upper end with cross-piece 67, upon the rear end of which is formed the tripping projection 68 and upon the front end of which is formed the ripping projection 69. Longitudinal movement of yoke 55 will cause a corresponding longitudinal movement of the tripping arm 66 and projections 68 and 69, as these parts are rigidly secured together.

The rear end of shifting rod 47 is mounted in any suitable stationary bearing 70. This shifting rod has fixed thereto, as seen in Figs. 1, 2 and 3, a pin 71. Formed along one side of this shifting rod are notches 72, 73 and 74, in which are adapted to seat the pointed lower end of the spring-pressed solenoid plunger 75, the spring of which forces this pointed end into the adjacent notch at the appropriate time to lock the shifting rod against longitudinal movement. Solenoid 76 which operates solenoid plunger 75 is mounted in a suitable supporting bracket 77 secured to the rear wall of transmission casing 19. Energizing and deenergizing of this solenoid at the proper times will in cooperation with the spring of the spring-pressed plunger 75 move this plunger into or out of locking engagement with the adjacent notch in shifting rod 47, as later more fully explained.

Shifting levers 27, 39 and 46 (see Fig. 2) are rotatably mounted upon pins or stub shafts 78 forming part of the bracket 79 which is fixed to the interior of the transmission housing 19.

Fixed to or formed integral with bracket member 79 is a downwardly extending angular web 80. This web extends downwardly and toward the rear at an angle from the stub shaft 78 which supports shifting lever 27, but web 80 extends downwardly and forwardly from the stub shafts 78 which support shifting levers 39 and 46. At the lower end of web 80 is formed a bearing sleeve 81 in which is rotatably mounted stub shaft 82, upon one end of which is fixed by means of a key, set screw or the like, the cam lever 83 carrying at its lower end the laterally extending roller sleeve 84. Upon the opposite end of stub shaft 82 is fixed the shifting fork 85, which is positioned to extend at a ninety degree angle with relation to cam lever 83 as seen in Fig. 4. Roller 84 is positioned within for movement along a longitudinal slot 86, with which each of the shifting levers 27, 39 and 46 is provided. Shifting fork 85 is formed with an open-ended slot 87, forming spaced arms 88 and 89, the free end of each of which is rounded as shown at 90. The upper end of each of shifting levers 27, 39 and 46 is formed with a pair of notches 91 and 92, which are spaced from each other a suitable distance for purposes later explained, and which notches respectively receive the tapered knife edge 93 carried by the lower end of the spring-pressed solenoid plunger 94, provided for longitudinal movement in each of solenoids 95, 96 and 97, so that when these plungers are in extended position under spring action they will enter the registering notch 91 or 92, and when retracted under action of the solenoid will be withdrawn from such notch.

The mechanism for shifting shifting levers 27, 39 and 46 described above, is the same for each of these shifting levers, with the exception that, as shown in Fig. 2, the two shifting forks 85 for levers 39 and 46 are fulcrumed to the front of the shifting levers, whereas in shifting lever 27 the same is fulcrumed to the rear thereof. The open end of the slot 87 in each of shifting forks 85 is, as seen in Fig. 2, so positioned as to receive shifting pin 71 when the same is moved toward and into the same. In order words, except when shifting pin 71 is within slot 87, the open ends of these slots are always so positioned that pin 71 may move thereinto upon appropriate longitudinal movement of shifting rod 47. This means that shifting pin 71 upon longitudinal movement of shifting rod 47 will enter slot 87 from one side, simultaneously rock together shifting fork 85 and cam lever 83 and swing the same about the fulcrum pin 82 an amount corresponding to the amount of longitudinal movement of shifting rod 47. If such longitudinal movement of the shifting rod is sufficient in extent, pin 71 will enter slot 87 and swing the shifting fork from its extreme position on one side to its extreme position on the other side, after which pin 71 will move out of said slot and on to the next shifting fork if the movement of the shifting rod is continued.

When trip arm 66 is moved to the rear a suitable distance, trip projection 68 contacts the trip finger 98 of the trip switch 99, shown more in detail in Fig. 5, and comprising in general a casing 100 within which is pivotally mounted the swinging trip finger 98 which slides through a slot 101. Trip finger 98 has a rearward extension 102 fixed thereto, which extension carries a roller 103 contacting the inner face of a concentric curved rocker arm 104 fulcrumed at 105 and formed with sufficient eccentricity that swinging movement of roller 103 will bring the same into contact with either solenoid plunger 106 or solenoid plunger 107, depending upon the direction of movement of trip finger 98. Trip finger 98 is provided with a coil spring 108 which tends to normally return the trip finger when released to the position shown in Fig. 5. Movement of solenoid plungers 106 or 107 will cause closing of switches 109 or 110, thus closing the circuit and causing a current of electricity to flow through conductors 112 and 111 through solenoid 113, or through circuits 112 and 113 through solenoid 114, depending upon which of these switches is operated. Energizing of either of these two solenoids will hold its respective plunger outwardly against the adjacent switch 109 or 110, and hold this switch closed until the solenoid is deenergized by breaking of its circuit elsewhere as later explained. Each of these solenoid plungers are spring-pressed so that when the solenoid circuit is broken the plunger 106 or 107 will be returned to the position shown in Fig. 5. Conductor 112 includes the winding of solenoid 115, and from there passes on through conductor 116 to circuit breaker switch 117, which circuit breaker switch 117 is connected through conductor 118 with the shifting rod locking solenoid 76, and thence to the shifting lever locking solenoids 97, 96 and 95, and thence to the battery designated diagrammatically in Fig. 1 at 119.

The motion of the yoke member 55 in response to torque reaction under variation of driving loads will produce motion of the extension 66 which bears the projections 68 and 69. The tripping of the switch 98 takes place every time collar 55 moves a great enough distance to pass the trigger 98. On the other hand, it will be evident that none of this motion of yoke member 55, extension 66 or trigger 98 takes place during the application of the neutral device.

As seen in the left-hand portion of Fig. 5, solenoid 115 is provided with a spring-pressed plunger 120, which has its lower end formed into a tapered valve 121 adapted to seat in the valve seat 122, in which when the solenoid is not energized the plunger is pressed downwardly to bring valve 121 against seat 122. When the solenoid is energized, plunger 120 is drawn thereinto to move valve 121 away from seat 122 and open up communication from vacuum line 123 (which connects with the intake manifold 124 of the engine) to the interior of the vacuum cylinder 125 to cause the piston head 126 therein to move toward the left-hand end of the cylinder as viewed in Figs. 1 and 5.

It is here pointed out that the lower end of solenoid plunger 120 beyond tapered valve 121 is provided with a coaxially extending rod 127 having at its lower end a valve 128 adapted to be seated against the valve seat 129 when the solenoid plunger 120 is pulled into the solenoid to establish communication between the vacuum line and the interior of the cylinder, whereby to prevent the entry of air through relief opening 130. When, however, tapered valve 121 is seated against valve seat 122, valve 128, as will be understood in Fig. 5, is moved away from its valve seat to open relief opening 130 to permit the entry of atmospheric air into the vacuum cylinder 125 to permit the piston head 126 to move to the right to the position shown in Fig. 1 under action of the spring, not shown, of the clutch pedal 131, which clutch pedal 131 is connected as shown in Fig. 1 through conventional parts with the rod 132 forming an extension of the piston rod 133. From this it will be understood that movement of the piston head 126 to the left in Fig. 1, as explained above, will release the clutch and movement of the same to the right will close the clutch.

As will be later more fully understood, it is highly desirable and necessary in my invention to prevent loss of the energy stored up in coil spring 53 or coil spring 54, depending upon which direction the drive shaft has moved. If no means were provided to prevent this loss of energy it would immediately become lost or dissipated when the clutch is released, but this is prevented in my invention by means now to be described, which will retain and preserve this stored up energy until it has been used for shifting the gears in the transmission housing.

To effect this end I have provided a supporting frame 134 which is suitably bolted to a stationary portion (not shown) of the frame of the automobile or such other mechanism in which my invention is being used. This stationary supporting member is provided at each end with a sleeve bearing 135, in each of which is slidably mounted a rod 136, the lower end of each of which is secured to and carries the rack bar 137. This construction enables a vertical movement of rack bar 137 by virtue of rods 136 sliding up or down in their respective sleeve bearings 135. Mounted upon supporting frame 134 is a solenoid 138, the spring-pressed plunger 139 of which carries a depending rod or extension 140 fixed at its lower end to rack bar 137, whereby when the solenoid is energized its plunger 139 is forced downwardly to bring the teeth of rack bar 137 into engagement with the teeth 141 on the upper surface of yoke 55 whereby when these teeth are thus engaged the yoke 55 cannot move, and in turn prevents longitudinal movement of shifting rod 47, which in turn holds or preserves the tension stored up in either of coil springs 53 or 54 (depending upon the direction of movement of drive shaft 4) when the clutch is released.

Solenoid 138 is energized only at such times as wiper arm 146 is pushed aside by projection 145. As this takes place only during the brief period when the clutch pedal is applied, it will be seen that this solenoid is energized very little.

Further, it will be noticed that the collar 55 does not move at all during the operation of the neutral lever and cable. This is because the driving shaft has no longitudinal motion at that time and the arm 58 would prevent the collar 55 from being moved. This calls for the spring 54 being compressed between the collar 52 and the collar 55 due to a considerable rearward movement of the shifting rod 47 under the pull of the neutral cable 154. This pull of the neutral cable is maintained all the time in which the manual lever 158 is in the notch 163, provided to secure it in neutral position as shown in Fig. 7.

It is to be understood that when the teeth on the bottom of rack bar 137 engage the teeth on the top of yoke 55, the latter will have moved from the position shown in Fig. 1 to a position to the right in Fig. 1, and the coil spring 53 will as a result then be under compression. This engaging of the teeth in the rack bar and yoke, as will be understood will hold this spring 53 in compression and prevent the dissipation of the energy stored up therein at such time as the clutch is open. This locking operation takes place only when the clutch is released. When the shifting rod 47, which is shown in Fig. 1 in the position it will occupy when the gears are in high, has been moved to the right in Fig. 1, so that the gears are in intermediate or low, it will be understood that what has just been described regarding compression of spring 53 may then take place in connection with spring 54 when the movement is in a direction to compress the latter spring. The mechanism and connections for automatically causing this locking yoke 55 to maintain the compression in one or the other of the coil springs 53 and 54 will now be described.

When the piston head 126 has moved to the left to its limit of movement in Fig. 1, the underface of the piston head will contact the head and spring-pressed plunger 142 shown in the left-hand portion of Fig. 5, which will in turn swing the pivoted lever arm 143, whose free end will in turn move arm 144 of circuit breaker switch 117 so as to open this switch and break the circuit to solenoids 76, 97, 96 and 95, and also solenoid 115 to deenergize these solenoids. Deenergizing of solenoid 76 will permit the solenoid plunger 75 to be pressed by its spring outwardly against shifting rod 47 and enter the next notch that comes in registry therewith, and thus lock the shifting rod 47 against further longitudinal movement. Deenergization of solenoids 97, 96 and 95 will cause their respective solenoid plungers 94 to move outwardly under spring action and bring the locking projection 93 into one or the other of locking grooves 91 or 92, dependent upon which one is in registry with said locking projection, thus holding the shifting gears positively in the position to which they have been moved at this operation. Deenergizing of solenoid 115 causes solenoid plunger 120 to move outwardly under action of its spring to close valve 121, as explained earlier herein.

During this movement to the left in Fig. 1 of piston head 126, the free end of wiper arm 145 fixed to piston rod 133 will wipe over the bell-crank 146, fulcrumed on a stationary support, depressing the long arm thereof, and moving the short arm 147 to the left, carrying with it the movable switch arm 148, thus closing the switch 149 and closing the circuit through conductor 150 which connects solenoid 138 with the battery. This energizes solenoid 138 and causes its plunger 139 to move downwardly and lock yoke 55 against further longitudinal movement as explained above.

As will be understood, cylinder 125 (see Fig. 1) is provided at its right-hand end with an air relief port 151 to permit the free movement of air on this side of the piston head for a purpose that will be obvious.

The mechanism for placing the driving transmission in neutral will now be described. Referring to Figs. 1, 9 and 10, there is swingably mounted on the rear end wall of the transmission housing a supporting arm 152 having rotatably mounted thereon the pulley wheel 153, over which runs the cable 154, one end of this cable being fixed to the shifting rod 47 and the other end of the cable passing through the transmission housing and over any other suitable number and arrangement of pulleys in order to reach a convenient place adjacent the instrument board. As noted in Figs. 1 and 10, the connection between one end of the cable 154 and the shifting rod 47 is at a suitable distance forward of the forwardmost notch on this shifting rod, so that when the cable is operated to move the shifting rod 47 to the rear it will move a sufficient distance to bring the forwardmost notch under detent of the solenoid plunger 75.

As seen in Fig. 8 that end of cable 154 which is adjacent the instrument board is secured in the free end of arm 155, which is fulcrumed at 156 on a suitable stationary support. On the opposite side from arm 155 of fulcrum 156 is the neutral lever arm 157, the head 158 of which extends through the neutral slot 159 of a panel 160 of the instrument board. As seen in Fig. 9, the swingably mounted arm 152 is provided at its free end with a spring projection 161 which bears against resilient switch arm 162 which normally stands in open position. When a pull is applied to the front end of the neutral cable 154, the pull of this cable on pulley 153 will cause arm 152 to swing in a clockwise direction in Fig. 9, which will press spring 161 against switch arm 162 and close this switch, thus closing the circuit to solenoids 76, 97, 96 and 95. This energizing of solenoid 76 causes its plunger to be drawn into the solenoid, thus moving the detent on the end of this plunger out of engagement with the registry notch in shifting rod 47, which is necessary in order to permit rearward movement of this shifting rod by a pull on cable 154. This is further permitted by the energization of solenoids 97, 96 and 95, which remove their respective detents from locking notches 91 or 92, which, as will be understood, permits shifting pin 71 to move in succession through such of shifting forks 85 as may be to the rear of the same. Should this neutral cable be pulled when the transmission mechanism is in high, pin 71 will pass through all three of the shifting forks 85. This pull upon neutral cable 154 will be continued until notch 74 is to the rear of the detent of solenoid plunger 75. When the head 158 of neutral lever 157 reaches the bottom of slot 159 (Fig. 7), it will be pushed to the left into detent slot 163 to hold head 158 in this depressed position, with shifting rod 47 held to the rear in neutral position.

Upon operation of the neutral or reverse hand levers 158 or 175 shown in Fig. 7, which is a part of the dash-board or adjacent thereto, by the use of manual control the whole automatic process is interrupted, and by so doing the driver reverts to the more standard process of manual or hand control. Under manual control or control at the direction of the operator, it is customary and necessary to declutch by use of clutch pedal 131 before moving a gear shifting lever into any change of position whatever. This operation of the clutch pedal for the purpose of releasing the clutch and permitting of the movement of the shifting rod through the succession of gears and their shifting devices would be necessary upon shifting into neutral or from shifting from neutral into low. It will be noted in Fig. 7 that there is a notch provided at 163 to hold the manual lever 158 in neutral. Another notch on the opposite side of the vertical slot 159 is provided for the purpose of enabling the driver to shift conveniently from neutral to low, as at that position the shifting rod will have been released sufficiently to return under the urge of spring 54 to such position that the low gear will be engaged.

In order to permit this lateral movement of head 158, there will be sufficient play or lost motion in fulcrum 156 of neutral lever 157 to accommodate the same. After head 158 has entered notch 163 and just shortly before it has reached its limit of lateral movement, head 158 or an adjacent part of neutral lever 157 will strike an arm 164 of circuit breaker switch 165 to open this switch and break the circuit to solenoids 76, 97, 96 and 95 to deenergize these solenoids and permit their spring-pressed plungers to be pushed outwardly whereby the detent of plunger 75 will rest against the shifting rod 47 and be ready to later enter such notch therein as comes opposite the same, and the detent on the end of the plungers in solenoids 97, 96 and 95 will enter that one of notches 91 or 92 of the shifting levers that will hold the associated shifting gear out of driving engagement with its complemental spur gear.

Circuit breaker 165 controls the circuit to switch 162 (Fig. 9) and when head 158 of neutral lever 157 is moved out of the lateral notch 163, circuit breaker switch 165 will be automatically closed to again close the circuit to switch 162, which circuit will again be broken when the pull on rocker arm 152 is released as a result of releasing the pull on the neutral cable.

Due to the shifting rod 47 having been pulled to the rear by the pull on the neutral cable 154, the shifting pin 71 will be in a position to first shift the gears into low as the shifting rod moves forwardly in response to the stored up energy in coil spring 54, and as the load resistance becomes less as a result of the automobile or other mechanism gaining speed, shifting pin 71 will as it further moves forwardly in turn shift the gears into medium and high in succession as required.

The reverse mechanism will now be described. As seen in Figs. 1 and 2, spur gear 32 is spaced from spur gear 166 a suitable distance to receive therebetween reverse idler gear 167, which is longitudinally slidable on stub shaft 168 through the medium of bellcrank 169 shown in Fig. 6. As will be understood, when idler gear 167 is caused to mesh with each of gears 32 and 166, this will reverse the direction of rotation of driving shaft 4 in an obvious manner. Bellcrank 169 is normally rotated in a clockwise direction in Fig. 6 by spring 170. To effect counterclockwise movement of bellcrank 169 in Fig. 6 so as to shift the idler gear 167 into mesh with each of gears 32 and 166, a cable 171 is attached to the free end of arm 172 of bellcrank 169, which cable passes over a pulley 173 and through any suitable number of additional pulleys of such arrangement as to bring the end of this cable 171 adjacent slot 174 in a panel of the instrument board and more or less closely adjacent to the neutral slot 159.

Projecting through slot 174 is a head 175 of a bellcrank similar to the neutral bellcrank 155—157 of Fig. 8, cable 171 being attached to the bellcrank of head 175 in a similar manner to the attachment of the cable 154 to the neutral bellcrank in Fig. 8. In other words, the neutral head 158 and the reversing head 175 move up and down in the slots 159 and 174. Fixed to the neutral lever 157 and extending to the right as shown in Figs. 7 and 8, is a bar 176 which extends to a position under the lever of reverse head 175, so that the reverse lever head 175 cannot be moved downwardly in slot 174 unless neutral head 158 has prior thereto been moved downwardly in its slot 159. This prevents reverse being effected until all the other gears have been locked in neutral. At the bottom of the reversing slot 174 is a laterally extending notch 177 into which the reverse head 175 can be moved when the gears are in reverse to positively hold them in such reverse position.

In Fig. 10 is shown a modified form of my invention in which instead of causing the energy to be stored up in the springs on the shifting rod by means of a shifting lever operated directly from the drive shaft, this latter mechanism is omitted and I have substituted therefor a hydraulic means which will now be described.

As seen in Fig. 10, an hydraulic cylinder 178 is formed in the forward portion of the differential housing, in which cylinder operates a piston head 179 to displace oil in said cylinder 178 by forcing said oil through pipe line 180 to the front end of cylinder 181 to act against a piston head 182 therein. Rigidly connected with piston head 182 is a piston rod 183 having fixed at its front end the shifting arm 184, which is bifurcated at its lower ends to straddle shifting rod 47 and operate the spring-pressed cup members 185 in either direction depending upon the direction of movement of piston head 182. The cup members 51 and 52 of Fig. 1 are also secured to shifting rod 47 so that movement of the lower end of shifting arm 184 will store up energy in one or the other of the coil springs 53 or 54, depending upon the direction of movement of piston head 182.

The amount of movement of shifting arm 184 is controlled by the quantity of oil forced into cylinder 181 from cylinder 178, and in order to control the amount of movement of piston head 182 and shifting arm 184, cylinder 181 is so proportioned with relation to cylinder 178 that a small amount of movement of piston head 179 will cause the requisite amount of movement of piston head 182 to accomplish the gear shifting operations. Aside from this hydraulic operation of the shifting arm 184, instead of the use of the form of shifting lever shown in Fig. 1, the operation of the parts in Fig. 10 are similar to those in Fig. 1, with the further exception that in Fig. 10 the positive holding of the stored up energy in either of springs 53 or 54 is effected through the hydraulic pressure instead of the locking rack bar 137 and teeth on the top of yoke 55 in Fig. 1. This control of the hydraulic pressure in Fig. 10 is effected as follows:

When the circuit is closed through movement of bell-crank 146 by wiper arm 145, solenoid 187 is energized which causes valve 188 to seat against valve seat 189, which prevents the oil in cylinder 181 and against piston head 182 from any release from this cylinder, thus positively maintaining piston rod 183 and shifting arm 184 in the position already occupied. This is necessary, as will be understood, only when the clutch is released. As soon as piston head 126 in cylinder 125 reaches its rearmost limit of movement, rocker arm 146 through appropriate spring pressure, is returned to its original position and switch arm 148 moved to open the switch and deenergize solenoid 187 and move valve 188 from its valve seat 189, releasing the lock on the oil line and occurring after the clutch is again engaged.

The drive shaft 4 in Fig. 10 is moved longitudinally by the load resistance between worm gear 3 and worm 5 in a manner similar to that described in connection with Fig. 1. During the forward longitudinal movement of drive shaft 4, coil spring 13 will be compressed at the same time that piston head 179 is moved forwardly. When the load resistance decreases sufficiently coil spring 13 will cause drive shaft 4 to move rearwardly, which in turn will move piston head 179 rearwardly and correspondingly withdraw oil from cylinder 181, thereby causing forward movement of the shifting arm 184, thereby causing shifting rod 47 to move forwardly and accomplish the shifting of the gears from low to intermediate or high in accordance with the corresponding lessening in the load resistance as automobile or other mechanism picks up speed.

In Figs. 11, 12, 13 and 14 I have shown a further modification of the mechanism for operating the gear shifting levers. In this modification instead of using the shifting fork and cam levers of Figs. 2 and 4, I have omitted these and fulcrum the shifting levers 27', 39' and 46' on suitable fulcrum shafts 190. These shifting levers on the opposite side of their fulcrum are provided with the extensions 191 which enter cam slots 192, 193 and 194 of rotatable disks 195, 196 and 197 which are formed in their circumferential edge with suitably spaced notches 198. These disks are rotatably mounted on stub shafts 199 and have fixed thereto or integrally formed therewith the mutilated gears 200, 201 and 202, which mutilated gears cooperate at the proper time with rack teeth 203 formed in the required position on the shifting rod 47'. Cooperating with notches 198 are the detents 204 fulcrumed at 205 and normally spring-pressed to hold detent 204 in the registering one of notches 198, in order to positively hold the shifting gear in or out of mesh, as will be readily understood. On the opposite side of fulcrum 205 the detent members are formed with a right angled arm 206, positioned closely to which is the pole end of an electro-magnet 207, which upon energization at the proper time and in proper sequence will attract arm 206 and withdraw detent 204 from notch 198 to permit rotation of disk 197.

As seen in Fig. 12, the cam slots 192, 193 and 194 are so formed that when the end of arm 191 is in the middle portion of this slot the free end of the corresponding shifting lever will be moved in one direction, while when the cam slot is moved to bring end 191 to one or the other of its end portions, the free end of the shifting arms will be moved in the opposite direction. For example, referring to disk 195, when arm 191 is in the position shown in Fig. 12 and in the middle of cam slot 192, the free end of shifting lever 27' will be in such position that the clutch member 22 will have been moved into driving engagement with the spur gear 21. When the cam slot 192 has moved to bring the end of the same to arm 191, the free end of shifting lever 27' will be moved in the opposite direction to disengage clutch member 22 from spur gear 21. Cam slots 193 and 194 operate shifting levers 39' and 46' in a similar manner, these parts being so formed and positioned to effect the shifting into intermediate or low at the proper time.

The general operation of the electro-magnets 207 which control detents 204 and the locking or unlocking of the disks 195, 196 and 197, corresponds generally to the operation of the solenoids 95, 96 and 97 described in connection with Fig. 2. The rotation of disks 195, 196 and 197 is effected at the proper time by engagement of rack teeth 203 with the mutilated gears 200, 201, 202, as these rack teeth 203 are brought opposite the teeth of these mutilated gears, the number of teeth in these mutilated gears being such as to give disks 195, 196 and 197 the proper amount of rotation to effect the shifting of their respective gears. The number of rack teeth 203 is made sufficient to effect this result, and after these teeth have passed the mutilated gears associated with disk 195, they next engage the mutilated gears associated with disk 196, and after having passed the latter mutilated gears they operate the mutilated gears associated with disk 197. As the shifting rod 47' is moved forwardly rack teeth 203 operate these mutilated gears in the opposite direction and in the opposite sequence to effect the opposite movement of the shifting gears, as will be readily understood. These mutilated gears and rack teeth on the shifting rod, and the corresponding operation of the shifting levers and the detents 204 and electromagnets 207, will be more readily understood by an inspection of Fig. 14.

It is believed that with the above description it will be readily apparent how the mechanism illustrated in Figs. 11, 12, 13 and 14 may be substituted for the shifting mechanism described in connection with the other figures of the drawings.

In the operation of my self-adjusting gear shifting mechanism, assuming the same to be applied to an automobile and the automobile in motion under normal conditions with the gears in high, as shown in Fig. 1, the load resistance between the driven gear 3 and the driving worm 5 will be such that the driving shaft will be toward the rear as shown in this figure, it being normally maintained in that position because of the strength of the coil spring 13 being sufficient to hold drive shaft 4 in its rearmost position under normal driving conditions. Under these conditions there will be no compressing movement transmitted to either of springs 53 and 54, any such compression having been already used in the last preceding motion transmitted to the shifting rod 47.

The pin 71 will be within the shifting fork 85 of gear shifting lever 27, with the fork in vertical position, the cam lever 83 in horizontal position at right angles thereto holding shifting lever 27 in the forward position, and with clutch member 22 inserted into spur gear 21 with the internal teeth thereof and clutch member 22 in driving engagement. This connects engine shaft 20 and driving shaft 4 directly together to rotate at the same speed. Also at this time the shifting fork of each of shifting levers 39 and 46 will extend toward the front of the car in the position shown in Fig. 2, and all three of the shifting levers 27, 39 and 46 will be locked in their respective positions just referred to by the detent on the end of the solenoid plunger entering one or the other of the notches 91 or 92 in the top of these shifting levers. For example, under the conditions just stated, this locking detent will be in notch 92 of lever 27, while the locking detent of each of solenoids 96 and 97 will also be in notch 92, as will be understood in Fig. 2. It is thus seen that under these conditions the front clutch member 22 will be in driving engagement with its spur gear 21, and each of clutch members 36 and 42 will be out of engagement with their respective spur gears, which latter gears are idling on drive shaft 4. Also at this time the detent of locking plunger 75 of solenoid 76 will be in engagement with the rearmost notch 72 of shifting rod 47, this notch corresponding always with the high gear position.

It is here important to note that the tripping projection 68 of trip arm 66 is forward of trip finger 98, which latter stands in its normal position with the circuits of the trip switch 99 broken. This means that all of the solenoids on this circuit, to-wit, solenoids 115, 76, 97, 96 and 95 are all deenergized and their spring-pressed plungers protruded to accomplish their valve seating and locking operation. Under these conditions clutch pedal 131 is in its up position with the clutch engaged, and due to the clutch pedal spring, piston head 126 is in its extended or rearmost position with the cylinder open to the atmosphere through the valve controlled opening 130.

Assuming now that the load resistance is increased a sufficient amount, an added strain will be thrown on the driving mechanism, with the result that worm 5 will be pushed forwardly (to the left in Fig. 1) with a corresponding movement of drive shaft 4, and putting coil spring 13 under added compression. This will move shifting arm 58 about its fulcrum in a clockwise direction, its roller head 57 moving yoke 55 to the rear (to the right in Fig. 1) to compress coil spring 53, and when this movement is continued a sufficient amount trip projection 68 of trip arm 66 will move tripping finger 98 to the right and through rocker arm 104 and plunger 106 will close switch 109 and the circuit through conductors 112 and 111 and the further conductors in this circuit, as referred to above, thus energizing solenoids 113, 115, 76, 97, 96 and 95. Solenoid 113 thus draws into itself spring-pressed plunger 106 to hold switch 109 closed, while solenoid 115 draws plunger 120 into itself and opens valve 121 to connect the interior of cylinder 125 with the vacuum line 123, while at the same time closing valve 128 to cut off communication of the interior of this cylinder with the atmosphere.

Circuit breaker switch 144 is closed as shown in Fig. 5. Solenoid 76 being energized draws into itself its plunger 75, thus withdrawing its detent from notch 72 in shifting rod 47. Also energization of each of solenoids 97, 96 and 95 causes their plunger to be drawn thereinto and release the detent on the end thereof from whichever of notches 91, 92 the same may be in. It is thus seen that the parts are now in position for shifting of the shifting rod 47 under action of the energy stored up in spring 53, which, as seen, will move the shifting rod to the right in Fig. 1. In order to prevent too great a movement of shifting rod 47, I have provided means for releasing the spring-pressed plunger 75 of solenoid 76 quickly after it has been withdrawn from its notch, so that it will again contact the shifting rod slidably and be in position to jump into the next notch that comes in registry therewith, which under the movement now being described will be notch 73. This quick release of plunger 75 is effected by the front face of piston head 126 striking the end of spring-pressed plunger 142, so as to move switch arm 144 and open the circuit breaker switch shown in Fig. 5, which breaks the circuit now being considered and deenergizes solenoids 113, 115, 76, 97, 96 and 95, with the result that plunger 75 immediately under action of its spring jumps back into contact with the adjacent side of shifting rod 47, and its detent will enter notch 73 as quick as this notch registers therewith.

Simultaneously with this release of plunger 75, the deenergization of solenoids 97, 96 and 95 will permit their spring-pressed plungers to be released and protruded, so that their respective detents will be in position to jump into either of notches 91 or 92 that may present themselves thereto. Also simultaneously the deenergizing of solenoid 115 will release its plunger, which will be protruded by its spring to again seat valve 121 and open port 130 to the atmosphere, thus permitting piston head 126 to move to the rear under action of the clutch pedal spring not shown. Also simultaneously the deenergizing of solenoid 113 will permit its spring-pressed plunger 106 to be protruded, permitting spring switch 109 to open ready for another movement. Trip finger 98 has been returned to its normal vertical position shown in Fig. 5 by its coil spring 108 and is ready for another operation.

This moving of detent plungers 75 and 94 of the three solenoids 95, 96 and 97 into unlocking position, and their subsequent release so that they can go back again into locking position, as just described, is done quickly so that these detents will be at once available for entering the next notch presented, which controls the distance the shifting rod is moved and holds the shifting levers 27, 39 and 46 with their attendant clutch members under positive control to prevent their being moved at the wrong time or in the wrong direction. This movement of the shifting rod 47 from notch 72 to notch 73 with relation to the detent of plunger 75, carries the shifting pin 71 to the position shown in Fig. 2, thus swinging shifting fork 85 from a vertical to a rearwardly inclined position, which permits pin 71 during its longitudinal travel to move out of the slot in this fork as shown in Fig. 2, which movement causes clutch member 22 to slide to the rear longitudinally of drive shaft 4 and out of engagement with spur gear 21 by reason of the travel of roller 84 in slot 86. Pin 71 continues to move rearwardly with shifting rod 47 and, as will be appreciated in Fig. 2, enters the slot 87 of the shifting fork of shifting lever 39, moving it to a vertical position. At this point the movement of shifting pin 71 is stopped due to the detent of plunger 75 having entered notch 73 in shifting rod 47, which must be so positioned as to bring this about. This, as will be appreciated in Fig. 2, has moved the lower end of shifting lever 39 to the right and carried clutch member 36 into the toothed hollow interior of spur gear 33 to engage with the teeth therein, and at the same time leaving shifting lever 27 locked in the position it was when pin 71 left it, and not disturbing shifting lever 46 because of the shifting pin not having yet reached the shifting fork of that lever. This means that the gears are now in intermediate, as they should be to take care of the added load resistance responsible for the movements just described.

It is also to be kept in mind that during the shifting of the gears from high to intermediate the clutch was momentarily released by the movement of piston head 126, piston rod 133 and connecting rod 132 to the left in Fig. 1. During this slight interval of clutch release the lever arm 146 was depressed by wiper arm 145 to close switch arm 148 and energize solenoid 138 and move solenoid plunger 139 downwardly to bring the teeth of rack bar 137 into engagement with the teeth on the adjacent face of yoke 55 to positively hold the yoke in the position which it then occupies and prevent dissipation of the energy stored up by the movement described above in coil spring 53. The need for this locking of yoke 55 in position when the clutch is released is that the direct connection to the engine has been broken and the load resistance no longer felt against the driving power. As will be understood, this locking of yoke 55 to prevent dissipation of the energy in spring 53 is only required for the short interval that the clutch is released, after which it is necessary that yoke 55 be quickly unlocked, which is effected by the return of piston head 126 to the right in Fig. 1, as explained above, which removes the wiper arm 145 from lever arm 146 and again permits the spring urged switch arm 148 to move to open position and deenergize solenoid 138 to permit its spring-pressed plunger 139 to move upwardly under action of its spring and move the teeth of rack bar 138 away from engagement with the teeth on the yoke 55.

The operation and movement of parts in shifting the gears from high to intermediate will be clearly understood from the above, from which the other required movements in the gear shifting operation will it is believed be clear. If the load resistance continues to increase or subsequently increases, the driving shaft 4 will be moved further forwardly with more energy being stored up in the main coil spring 13 and with further rearward movement of yoke 55, thus again storing up energy in the spring 53. When this rearward movement of yoke 55 has continued far enough to carry trip arm 66 to the right in Fig. 1 to cause trip projection 69 to operate tripping finger 98 of trip switch 99, the detent plunger 75 of solenoid 76 will again be withdrawn and moved out of notch 73 to permit shifting rod 47 to move rearwardly under the pressure from spring 53, carrying with it shifting pin 71, which will swing the shifting fork 85 of shifting lever 39 from the vertical position in which it was left in the operation described above to the rear to permit shifting pin 71 to move out of slot 87 and into slot 87 of the next shifting fork on shifting lever 46. This movement of the shifting fork of shifting lever 39 has moved the clutch member 36 out of engagement with spur gear 33 by virtue of roller 84 having passed upwardly beyond the horizontal line of fulcrum pin 82 and to the left in Fig. 2, which swings the lower end of shifting lever 39 to the left to effect this declutching action.

As described above in connection with shifting from high to intermediate, the tripping of the tripping finger 98 of switch 99 through the energization of the solenoids has also effected the momentary unlocking of the shifting levers 27, 39 and 46 to permit their movement now being described. Also in a manner similar to that described above, the solenoid 115 was energized to open valve 121 and close valve 128 to cause piston head 126 to move to the left in Fig. 1 through connection with the vacuum line, and a similar operation of solenoids 113 and 114 which need not again be repeated. Continued movement to the rear of shifting pin 71 in Fig. 2 will carry this pin into the slot of the shifting fork of shifting lever 46 and move this work 85 to a vertical position which will carry the clutching gear 42 into clutching engagement with the internal teeth in spur gear 34 to put the gears into low.

As will be understood from Fig. 2, when clutch member 42 has been moved into engagement with spur gear 34 for low gear driving, clutch members 22 and 36 will be out of engagement with their respective gears. During this movement the detent plunger 75 of solenoid 76 and the detent plungers of solenoids 97, 96 and 95, were only momentarily withdrawn from their corresponding notches, so that the detent plunger 75 would be quickly available for entry into the next notch of shifting rod 47 and the plungers 94 of solenoids 95, 96 and 97 quickly returned to position to lock their respective shifting levers. Detent plunger 75 will thus be in position to jump into notch 74 when the shifting rod has moved that distance, notch 74 being so positioned on the shifting rod as to bring the shifting fork of shifting lever 46 into a vertical position and the gears properly meshed in low when notch 74 registers with detent plunger 75.

When the load resistance lessens to a sufficient degree the energy stored up in the main spring 13 will cause driving shaft 4 to move rearwardly and effect a reverse movement of the various parts, with a consequent forward movement of shifting pin 71 through its various positions with relation to the shifting fork of shifting levers 27, 39 and 46, to bring about the shifting of the gears from low to intermediate and high in proportion to the degrees in load resistance, in a manner similar to that pointed out above for the shifting of the gears from high to low. A glance at Fig. 2 will show that the shifting forks 85 and their associated parts are so arranged as to permit the shifting pin 71 to move into the slot in each of these forks to move these shifting forks one at a time either into vertical movement or an angular position with relation to the side of the shifting lever. Also shifting pin 71 in effecting the shifting of the gears can move from its position when the shifting fork of lever 27 is vertical, rearwardly through the shifting fork of shifting lever 39 and later through and out of the same into fork 85 of shifting lever 46. In other words, this movement of shifting pin 71 into and through the various shifting yokes may be accomplished in either forward or rearward movement of the shifting rod, as will be readily understood from the above description, with the momentary unlocking of the various detents at the proper time and in the controlled manner described above.

The modifications shown in Figs. 10 to 13, inclusive, as described earlier herein, differ somewhat in structure but their general operation will be the same as that described in connection with the preferred form, except for the obvious differences resulting from the slight change in structure.

Fig. 15 shows a further modification of my invention, which modification comprises the substitution of the conventional ring and pinion bevel gears in the rear axle drive instead of the worm and gear drive as shown in Figs. 1 and 10. To permit the pinion gear 210 to move in response to the increase in back pressure from the resistance of the rear axle to the power of the drive shaft, which is transmitted to pinion gear 210 through ring gear 211, the bearing of the pinion gear 210 is mounted within the two sides of a supporting bracket comprising two curved plates 212 (one behind the other in Fig. 15), each of these plates being formed with an arcuate slot 213 whose curvature is concentric with ring gear 211. These plates 212 are secured by bolts 214 to supporting members 215 suitably secured to the automobile chassis or other convenient portion of the automobile or other mechanism in which my invention is being used.

Pinion 210 is fixed to shaft 216, which at one end is connected to the shaft 217 by universal joint member 218 to permit up and down movement of these two shafts. Shaft 217 is provided with splines 219 of a similar nature to spline 18 in Figs. 1 and 10 to permit relative longitudinal movement between these two shafts. Shaft 216 is rotatable in the floating bearing 220, which carries on its opposite sides studs 221 which move up and down in slots 213. Also pivoted to one of these studs 221 at its bottom end is an arcuate arm 222, which is provided with an arcuate slot 223, which slot as arm 222 moves up and down moves over and is guided by a pin 224 fixed to arm 225, which in turn is secured to the supporting member 215.

The upper end of arm 222 is provided with an outstanding stud 226 which has movement in slot 227 formed in the free end of piston rod 228, which carries on its opposite end a piston head 229 reciprocally mounted in cylinder 230 with suitable packing glands and the like. Cylinder 230 is hingedly mounted on one or more pins 231 so as to permit this cylinder to have a greater or less swinging movement during operation of the device. Cylinder 230 is connected by a hose, flexible pipe or the like 232, with an operating cylinder, as shown in Fig. 10, for causing the gear shifting operations in a manner similar to the operations and arrangement of parts illustrated in Fig. 10, which need not be here repeated.

It is thus seen that in the modification of Fig. 15, when the load resistance is increased there is a tendency for pinion 210 to move upwardly on ring gear 211, thus causing stud 221 to move upwardly in slot 213 and slot 223 to move upwardly over pin 224, thus producing a motion at the upper end of arm 222 to the right in Fig. 15, which will cause piston rod 228 to carry piston head 229 to the right in cylinder 230 a distance depending upon the amount of such load resistance. This movement to the right of piston head 229 will force oil or other suitable liquid through tube 232 to parts similar to those shown in Fig. 10 for a similar purpose. When the load resistance decreases pinion 210 will move downwardly with relation to ring gear 211, with the result that piston head 229 will be moved to the left a corresponding amount.

It is also to be noted that the longitudinal axis of shaft 216 at all times passes through the center of the axle shaft 233, regardless of its elevated or depressed position. Spring 234 connecting bearing 220 with the lower support 215 furnishes the proper amount of resistance to give the desired action between these parts from the change in load resistance and, as is obvious, tends to normally return these parts to the lowered position shown in Fig. 15. It is believed the reciprocation of piston head 229 from the up and down motion of bearing 220 will be understood from the above in connection with Fig. 15 of the drawings.

It is thus seen that I have accomplished by the use of the conventional ring and pinion bevel gears, the same general results as those accomplished in the forms of my invention shown in Figs. 1 and 10. It is also pointed out that the spring 234 holds the bearing member 220 down to the bottom of slot 213 when the machine is driven in high gear at easy running strain. The strength of this spring is such that the spring will yield to a greater strain due to increased load.

In the modification shown in Fig. 16, the bevel ring gear 211 is keyed in the usual manner to the rear axle shaft 233, and the up and down movement of the bevel pinion gear 210 is effected through load resistance in the same manner as that shown and described in connection with Fig. 15. In Fig. 16, however, the mechanism is simplified and rendered more positive as shown. In Fig. 16 the curved plates 212 (there being one behind the other to constitute a pair of these plates spaced apart) are formed with the curved slot 213 similar to that in Fig. 15. The bearing 220' of Fig. 16 is similar to the bearing 220 in Fig. 15, except that the former has an upstanding perforated lug 241 in which is pivotally mounted a lateral pin 235 on the lower end of the piston rod 236, it being understood that as the bearing 220' moves up and down it has slidable contact with the inner faces of the two spaced apart curved plates 212, there being provided a flat face on each side of bearing 220' to form this contact, and between each of these faces and the adjacent inner face of the curved plates 212 suitable anti-friction devices will be provided such as roller bearings, ball bearings, or the like.

Pin 235 which passes through the aperture in lug 241 also extends laterally in each direction a sufficient distance to be seated within the two curved slots 213 and be guided thereby in its up and down movement. Piston rod 236 at its upper end is reciprocally mounted within a cylinder 237, which is pivotally mounted to the differential housing in the same bracket or lugs provided for supporting the curved plates 212 at their upper ends. To effect this a pair of lugs 238 and 239 are integrally connected to a circular portion 240, which is swingably positioned over pin or bolt 214'. This arrangement permits cylinder 237 to swing to accommodate its change of position as the lower end of piston rod 236 moves along the curved slot 213. A spring 234' is connected between the lower rear end of bearing 220' and any suitable place in the lower portion of the differential housing, such as the bracket 215, bottom of the housing, or the like, this spring giving a normal downward urge to the bevel pinion gear 210 and bearing 220' in a manner similar to that described in connection with Fig. 15.

As the bevel pinion gear 210 is caused to move upwardly with relation to the bevel ring gear 211, due to increased load resistance the piston rod 236 will be carried upwardly and move its piston head 242 in an upward direction in cylinder 237, which parts are shown in detail in Fig. 17. Piston rod 236, as shown in Fig. 17, is of tubular construction to receive the supporting rod 243, which is fixed at its upper end to the piston head 244 and passes downwardly through an opening in the piston head 242 into the opening in piston rod 236 a sufficient distance to give lateral support to the piston head in its longitudinal movement in the cylinder and to counteract any undue side thrust imposed upon the piston head during operation of the laterally moving valve stem heads hereinafter described.

Threaded into suitably spaced openings in the side of the cylinder 237 are the pipes 245, 246 and 247, in which are mounted the valves 248, 249 and 250, respectively. Extending beyond these valves are the pipes 251, 252 and 253, respectively, each of which pipes connects with a gear shifting cylinder 254 shown in Fig. 18, it being understood that there will be one of these cylinders and its associated parts for each of the sets of gears to be shifted. Also formed in the side of cylinder 237 are openings 255 and 256, which at their inner ends are provided with extensions to form elongated recesses 257 within which are seated correspondingly elongated wiper arms 258 and 259. Fixed to wiper arms 258 and 259 to move therewith are the wiper rods 260 and 261, which are formed with tapered outer ends 262 and 263. Extending downwardly from valve 248 is an operating stem 264, while extending upwardly from valve 249 is an operating stem 265, and extending downwardly therefrom is a valve operating stem 266. Extending upwardly from valve 250 is an operating stem 267.

As shown in Fig. 17, when piston head 242 moves upwardly it immediately at the beveled adjacent side contacts the beveled lower end of wiper arm 259 and moves the same to the right against tension of spring 268 to force the tapered end 263 of wiper rod 261 between the ends of the operating stems 266 and 267 to open a valve within each of valves 249 and 250, which thus opens passage through the pipe lines 246, 252 and 247, 253. These pipe lines each lead to a gear shifting cylinder 254, and the hydraulic fluid in the cylinder 237 will be forced through pipe line 246, 252 to its cylinder 254 to cause shifting of the intermediate or second speed gears, while at the same time the fluid returns through pipe line 247, 253 from a corresponding cylinder 254 of the high speed gears, which are at this time being unmeshed.

As piston head 242 continues to rise it will ultimately pass above and out of contact with wiper arm 259, permitting this wiper arm and the wiper rod 261 to move to the left in Fig. 17 under action of the spring 268, thus again closing each of valves 249 and 250.

It is here pointed out that as piston head 242 starts to rise, wiper arm 259 will immediately move to the right, thus accommodating part of the liquid displacement caused by movement of the piston head, and such further accommodation as such liquid might require is accomplished by having a flexible medium used in two faces of the piston head 242, which flexible portions may be in the form of a diaphragm or the like of any suitable resiliency and resistance. Piston head 242 will be provided with the usual piston rings.

As piston head 242 continues to rise under action of the upward movement of bearing 220' and piston rod 236, it will next contact the lower beveled end of wiper arm 258 and move the same to the right in Fig. 17, and moves the valve rods 264 and 265 to open valves 248 and 249 in a manner similar to that described above in connection with valve rods 266 and 267 by wiper rod 261. This opens pipe lines 245, 251 and 246, 252, which are connected to the low gear shifting means and the intermediate gear shifting means, respectively, through their respective cylinders 254 and associated parts. As will be understood, the oil or other hydraulic liquid will be forced outwardly through pipe line 245, 251 and flow inwardly back to cylinder 237 through pipe line 246, 252.

The cylinders 254 and associated parts for shifting the gears will now be described.

Longitudinally slidable in cylinder 254 is the piston head 269 having piston rod 270, which extends outwardly through a suitable stuffing box 271 and carries at its outer end suitable collars or the like 272, to which are anchored the end 273 of spring length 274. Spring 274 at its opposite or outer end 275 is secured in a similar manner to collars 276 or other suitable connecting means to the outer section 277 of the piston rod. This provides a two part piston rod, which parts are movable longitudinally with relation to each other by or against the spring length 274, as will be more fully described. Extending upwardly and fixed to piston rod 270 is an upstanding peg 278 carrying a head 279 on its upper end, and extending through a slot 280 formed in the upper portion of the casing tube 281 which surrounds the spring length 274 and piston rods 270 and 277. Fixed to the outer section 277 of the two part piston rod is a collar 283 preferably in one or all of the gear shifting cylinders and associated parts as may be desired. In the present instance this is shown in detail in Fig. 20 as applied to the high gear shifting cylinder and associated parts, which are described in detail later.

Projecting upwardly from the upper surface of casing tube 281 is a pair of spaced supporting bearings 286, through which is slidably mounted the sliding bar 287, which is formed at one end, as shown in Fig. 18, with elongated slot 288. Downwardly extending from the right-hand end of bar 287 in Fig. 18 is a beveled lug 289, the lower end of which is slidable in slot 290 of the casing tube 281. The outer section 277 of the piston rod is formed on its lower face with notches 291, 292. Casing tube 281 on the lower face of its outer end is formed with a bearing member 293 provided with a counterbore to receive spring 294, which normally forces unlatching pin 295 upwardly to hold the latch projection 296 (fixed to pin 295) resiliently upward against the lower face of the outer section 277 of the piston rod so that when either of notches 291 or 292 registers with this latching projection, the latter will under action of spring 294 move thereinto. Latching pin 295 is beveled on each side of its upper end 297, so that as bevel lug 289 moves in either direction over pin 295 it will cause it to move downwardly to move latching projection 296 out of one or the other of notches 291 or 292, depending upon which one it is in engagement with. As pin 295 moves downwardly under action of bevel lug 289, it will at its lower end press against a resilient arm of switch 298, which will close a circuit and cause the operation of the automatic clutch as heretofore described.

In Fig. 19 is shown the outer end of section 277 of the two part piston rod, which is connected by a clevis 299 and pin 300 with a slotted bellcrank 301 which is fulcrumed at 302, and at its slotted upper end has connection with a cylindrical lug 303 of the yoke 304, which in turn shifts gear 305 into or out of engagement with gear 306.

In Fig. 20 is shown in detail a neutral device for placing the gears in neutral whenever desired. In this arrangement I have provided a collar 283 fixed to piston rod 277, and having pivotally connected at 282 a lever having at one end an arm 284 and at its opposite end a shorter angularly extending arm 285. Spring 307 extending between arm 284 and collar 283 is provided to normally hold arm 284 in elevated position. Depression of arm 284 will move latch 296 out of its corresponding notch in piston rod 277 to unlatch the same. To effect this downward unlatching movement of arm 284 there is provided a downwardly extending arm 308, which is fixed to arms 284 and 285, so that these three arms move rigidly together. At the lower end of arm 308 there is attached a pull cable 309, which leads to a suitable position adjacent the driver. Pull on cable 309 will, as will be readily understood, unlatch the latch 296 as described above. In order to limit the downward movement of arm 284 to the proper amount, a lug 310 is formed on collar 283, against which lug arm 285 contacts at the time arm 284 is at its lowest limit of movement.

The first pull upon neutral cable 309 will unlatch latch 296 from piston rod 277, and a continued pull will pull piston rod section 277 inwardly and compress spring 274. This inward movement of piston rod section 277 will stop just before latch 296 drops into the next notch. This pull, as will be understood, will disengage the gears, and latch finger 296 not dropping into a notch on the piston rod section will be in position to permit the gears to be shifted by reason of the stored up energy in spring 274 immediately upon release of the neutral cable. While this neutral is illustrated in the drawings as being applied at a time when the gears are in high, and the subsequent shifting of the gears will follow from high to the next lower in order, I wish it understood that such neutral mechanism can also be applied when the gears are in low and the shifting proceed from the lower to the higher gears before the starting of the car, by a simple arrangement similar to that which has been above described provided on the low gear shifting mechanism but pulling from the opposite direction to engage the low gears when the neutral lever has been released. When this arrangement on the low gear shifting mechanism is used upon releasing from neutral, it will be necessary to pull back the piston rod section 277 on the high gear shifting mechanism so that when it is pulled into neutral position it will be pulled far enough so that the latch 296 will become engaged with notch 292.

In the operation of the above it will be seen from what has gone before that as piston head 242 in cylinder 237 moves up and down therein, it will operate the wiper arms 258 and 259 at intervals to establish passage of liquid to or from the gear shifting cylinders 254. Referring to Fig. 16, this reciprocation of piston head 242 is effected by up and down movement of bearing 220', which up movement is caused by added load resistance and which down movement is caused by spring 234'.

This motion of ring and pinion gears while in mesh is made possible by the construction shown in Figs. 15 and 16, in which the support for the driving shaft is mounted between plates 212 which are so formed that the arc shown therein is shaped concentric with the center of the ring gear 211, and thus at all points within the motion of pinion gear 210 and bearing 220' the axis of the shaft of these two members will be continuously pointing at the center of ring gear 211 so that the relative positions of pinion gear 210 and ring gear 211 are never changed during any of this motion. The motion, which may be referred to as a climbing motion due to the driving rotation of pinion gear 210 against the resistance of ring gear 211, will take place within the structure so provided in such a way so as to at no time interfere with the proper driving of the mechanism.

As liquid is introduced against the adjacent face of piston head 269 in cylinder 254, this piston head will be moved forwardly in the cylinder, thus compressing the spring length 274 and storing up energy therein until such time as tripping lug 289 depresses unlatching pin 295, which unlatches latch 296 from notch 292 (see Fig. 18), upon which unlatching the tension in spring length 274 will cause piston rod section 277 to move outwardly, and through the medium of bellcrank 301 shift pinion gear 305 into mesh with gear 306. There will be one of these assemblies, including the cylinder 254 and associated parts, for each of the forward gear shifts.

Having now described my invention,
I claim:

1. In self-adjusting gear shifting mechanism, a clutch, a driven element, a driving shaft for driving said driven element and bodily movable by the load resistance between said element and shaft, a movable element caused to move by the bodily movement of said shaft, gear shifting mechanism, means for causing operation of said gear shifting mechanism from said movable element, and an electrical system of controls coordinating the operations and regulating the sequences of the gear shifting mechanism, said electrical system being controlled by the movement of said shaft, and including means for throwing out the clutch when the gears are shifted.

2. In self-adjusting gear shifting mechanism, a driven element, a longitudinally movable driving shaft, ratio changing members, a shifting element, means for shifting said shifting element from the bodily movement of the driving shaft, a shifting lever for each of the said members, means for swinging each of said levers for shifting its ratio changing member, said last mentioned means being operated by said shifting element to shift said members in sequence in either direction, said first mentioned means including means for storing up energy upon bodily movement of the driving shaft in either direction while the shifting element is held against movement, latch means for releasing the shifting element after said energy is stored up to permit it to be shifted by said energy, and electrically controlled means to operate said latch means at the proper time with relation to said stored up energy.

3. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, means for transmitting movement of said driving shaft to said member, latch means for holding said bar against movement until said energy is stored up for moving said bar, control means for releasing said latch at the proper time for shifting gears, said control means comprising a trip switch operated by movement of said member.

4. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, means for transmitting movement of said driving shaft to said member, latch means for holding said bar against movement until said energy is stored up for moving said bar, control means for releasing said latch at the proper time for shifting gears, said control means comprising a trip switch operated by movement of said member, and a solenoid for operating said latch means, said solenoid being operated by the circuit from said switch.

5. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, means for transmitting movement of said driving shaft to said member, latch means for holding said bar against movement until said energy is stored up for moving said bar, control means for releasing said latch at the proper time for shifting gears, said control means comprising a trip switch operated by movement of said member, a solenoid for operating said latch means, said solenoid being operated by the circuit from said switch, and a declutching cylinder having a piston head, means connected in said circuit for causing movement of said piston head upon operation of said switch, means for energizing said solenoid until the piston head has reached the end of its travel in one direction so as to release said latch means to permit shifting of the gears, and means for deenergizing said solenoid when the piston head has reached said end of travel so as to return said latch means into contact with said bar.

6. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, means for transmitting movement of said driving shaft to said member, latch means for holding said bar against movement until said energy is stored up for moving said bar, control means for releasing said latch at the proper time for shifting gears, said control means comprising a trip switch operated by movement of said member, a solenoid for operating said latch means, said solenoid being operated by the circuit from said switch, and a declutching cylinder having a piston head, means connected in said circuit for causing movement of said piston head upon operation of said switch, means for energizing said solenoid until the piston head has reached the end of its travel in one direction so as to release said latch means to permit shifting of the gears, and means for deenergizing said solenoid when the piston head has reached said end of travel so as to return said latch means into contact with said bar, and controllable means in said circuit for locking the gear shifting means against movement except while the gears are being shifted.

7. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, and means for transmitting movement of said driving shaft to said member, latch means for holding said bar against movement until said energy is stored up for moving said bar, control means for releasing said latch at the proper time for shifting gears, and mechanism for placing the gears in neutral including means for unlatching said latch means.

8. In self-adjusting gear shifting mechanism, a driven element, a bodily movable driving shaft movable by the variations in the load resistance, a longitudinally movable shifting bar, a member slidably associated with said shifting bar, resilient means connected between said member and said bar to store up energy upon movement of said member, and means for transmitting movement of said driving shaft to said member, latch means for holding said bar against movement until said energy is stored up for moving said bar, control means for releasing said latch at the proper time for shifting gears, mechanism for placing the gears in neutral including means for unlatching said latch means, reversing mechanism, and means for preventing reverse being effected until all the other gears have been locked in neutral.

9. In self-adjusting gear shifting mechanism, a plurality of ratio changing members, a movable gear shifting element, movable means associated with said shifting element, a trip switch operated by said movable means, a vacuum cylinder having a piston, a valve for connecting said cylinder with the vacuum line, a circuit breaker, a solenoid, and a circuit connecting said switch, valve, circuit breaker and solenoid whereby when said switch is tripped the valve will be opened, said piston moved, the circuit breaker opened by the piston at the end of its stroke, and the solenoid first energized to free the said shifting element for movement and then deenergized to place it in condition to again lock the shifting element against movement.

10. In self-adjusting gear shifting mechanism, a plurality of ratio changing members, a movable gear shifting element, movable means associated with said shifting element, a trip switch operated by said movable means, a vacuum cylinder having a piston, a valve for connecting said cylinder with the vacuum line, a circuit breaker, a solenoid, and a circuit connecting said switch, valve, circuit breaker and solenoid whereby when said switch is tripped the valve will be opened, said piston moved, the circuit breaker opened by the piston at the end of its stroke, and the solenoid first energized to free the said shifting element for movement and then deenergized to place it in condition to again lock the shifting element against movement, transmitting means for transmitting motion of the shifting element to the ratio changing members, additional solenoids one for the transmitting means for each ratio changing member, said additional solenoids each also being in said circuit to lock said transmitting means against motion except when the ratio changing members are being shifted.

11. In self-adjusting gear shifting mechanism, a driven element, a driving shaft mounted for longitudinal movement by said driven element upon variation in load resistance, speed change gearing, and separate automatic gear shifting mechanism for shifting said gearing upon variations in the load resistance, said gear shifting mechanism comprising a pair of hydraulic cylinders and pistons proportionally formed to transform longitudinal movement of said driving shaft into a shifting movement of said gearing in accordance with variations of the load resistance, one cylinder being mounted on said driving shaft with its piston fixed to said shaft, a separate cylinder of proportionate size in communication with the cylinder on the driving shaft, a piston in said separate cylinder, and means connected with said last mentioned piston and operated thereby for shifting said speed change gearing.

12. In self-adjusting gear shifting mechanism, a driven element, a driving shaft mounted for longitudinal movement by said driven element upon variation in load resistance, speed change gearing, and separate automatic gear shifting mechanism for shifting said gearing upon variations in the load resistance, said gear shifting mechanism comprising a pair of hydraulic cylinders and pistons proportionally formed to transform longitudinal movement of said driving shaft into a shifting movement of said gearing in accordance with variations of the load resistance, one cylinder being mounted on said driving shaft with its piston fixed to said shaft, a separate cylinder of proportionate size in communication with the cylinder on the driving shaft, a piston in said separate cylinder, and means connected with said last mentioned piston and operated thereby for shifting said speed change gearing, said last mentioned means including resilient means for storing up gearing shifting energy until required.

13. In self-adjusting gear shifting mechanism, a driven element, a driving shaft mounted for longitudinal movement by said driven element upon variation in load resistance, speed change gearing, and separate automatic gear shifting mechanism for shifting said gearing upon variations in the load resistance, said gear shifting mechanism comprising a pair of hydraulic cylinders and piston proportionally formed to transform longitudinal movement of said driving shaft into a shifting movement of said gearing in accordance with variations of the load resistance, one cylinder being mounted on said driving shaft with its piston fixed to said shaft, a separate cylinder of proportionate size in communication with the cylinder on the driving shaft, a piston in said separate cylinder, and means connected with said last mentioned piston and operated thereby for shifting said speed change gearing, said last mentioned means including resilient means for storing up gearing shifting energy until required, a clutch, means for releasing said clutch, said hydraulic cylinders forming a lock to prevent dissipation of said stored up energy when said clutch is released.

14. In self-adjusting gear shifting mechanism, a driven element, a driving shaft longitudinally movable by said driven element upon variation in load resistance, a first cylinder through which said shaft moves, a piston fixed to said shaft, liquid in said cylinder, a second cylinder in hydraulic connection with said first cylinder, a piston in said second cylinder, and means for storing up gear shifting energy upon longitudinal movement of the piston in said second cylinder.

15. In self-adjusting gear shifting mechanism, a driven element, a driving shaft longitudinally movable by said driven element upon variation in load resistance, a first cylinder through which said shaft moves, a piston fixed to said shaft, liquid in said cylinder, a second cylinder in hydraulic connection with said first cylinder, a piston in said second cylinder, and means for storing up gear shifting energy upon longitudinal movement of the piston in said second cylinder, said means comprising a longitudinally movable gear shifting bar, a coil spring on said bar, and means connecting the piston of said second cylinder with said spring for storing up energy in the spring as said second cylinder piston moves, said last mentioned piston moving in one direction as the load resistance increases, and in the opposite direction as the load resistance lessens.

16. In self-adjusting gear shifting mechanism, a driven element, a driving shaft mounted for bodily movement laterally by variations in the load resistance, shift gears, and means for translating said bodily movement into a movement for shifting said gears, said translating means comprising a hydraulic cylinder having a piston movable therein by said bodily movement, a second hydraulic cylinder in communication with the first mentioned cylinder and having a piston, and means connecting said last mentioned piston to gear shifting parts.

17. In self-adjusting gear shifting mechanism, a driven element, a driving shaft mounted for bodily movement laterally by variations in the load resistance, shift gears, and means for translating said bodily movement into a movement for shifting said gears, said translating means comprising a hydraulic cylinder having a piston movable therein by said bodily movement, a second hydraulic cylinder in communication with the first mentioned cylinder and having a piston, and means connecting said last mentioned piston to gear shifting parts, said driven element being a bevel ring gear, said driving shaft having fixed on one end a bevel pinion in mesh with said ring gear, increased load resistance causing said pinion to climb said ring gear, the longitudinal axis of said pinion always pointing to the axis of rotation of said ring gear.

18. In self-adjusting gear shifting mechanism, a driven element, a driving shaft mounted for bodily movement laterally by variations in the load resistance, shift gears, and means for translating said bodily movement into a movement for shifting said gears, said translating means comprising a hydraulic cylinder having a piston movable therein by said bodily movement, a second hydraulic cylinder in communication with the first mentioned cylinder and having a piston, means connecting said last mentioned piston to gear shifting parts, said driven element being a bevel ring gear, said driving shaft having fixed on one end a bevel pinion in mesh with said ring gear, increased load resistance causing said pinion to climb said ring gear, the longitudinal axis of said pinion always pointing to the axis of rotation of said ring gear, and a spring to assist in moving the pinion and associated parts downwardly upon decreased load resistance.

19. In self-adjusting gear shifting mechanism, a driven element, a driving shaft mounted for bodily movement laterally by variations in the load resistance, shift gears, and means for translating said bodily movement into a movement for shifting said gears, said translating means comprising a hydraulic cylinder having a piston movable therein by said bodily movement, a second hydraulic cylinder in communication with the first mentioned cylinder and having a piston, and means connecting said last mentioned piston to gear shifting parts, said driven element being a bevel ring gear, said driving shaft having fixed on one end a bevel pinion in mesh with said ring gear, increased load resistance causing said pinion to climb said ring gear, the longitudinal axis of said pinion always pointing to the axis of rotation of said ring gear, said driving shaft having a universal joint and means for permitting a portion of said shaft to have a longitudinal sliding movement with relation to the remainder of the shaft.

20. In self-adjusting gear shifting mechanism, a driven ring gear, a driving shaft mounted for bodily lateral movement in one plane, a pinion fixed on the driving shaft and in mesh with said ring gear, increased load resistance causing said pinion to climb on said ring gear and move the driving shaft laterally, and means for translating said lateral movement of the driving shaft into movement for shifting gears.

21. In self-adjusting gear shifting mechanism, a driven ring gear, a driving shaft mounted for bodily lateral movement in one plane, a pinion fixed on the driving shaft and in mesh with said ring gear, increased load resistance causing said pinion to climb on said ring gear and move the driving shaft laterally, and means for translating said lateral movement of the driving shaft into movement for shifting gears, the axis of rotation of the pinion pointing toward the axis of rotation of the ring gear in all positions of the pinion during operation.

22. In self-adjusting gear shifting mechanism, a driven element, a driving shaft caused to have bodily movements by variations in the load resistance, a hydraulic cylinder having a piston movable therein by said bodily movements, three pipe lines leading from said cylinder, a further cylinder and piston on the outer end of each of said pipe lines, a valve in each of said pipe lines, means associated with each of said further cylinders for storing up energy from movement of its respective piston, means for controlling said valves for periodically connecting the first mentioned cylinder with said further cylinder, and means for shifting gears by said stored up energy.

23. In self-adjusting gear shifting mechanism, a driven element, a driving shaft mounted for bodily movement laterally by variations in the load resistance, a hydraulic cylinder having a piston moved by said bodily movement, shifting gears, a further cylinder and piston for each shifting gear, means for storing up energy from the movement of said further pistons, and means for releasing said stored up energy at the proper time for shifting said gears.

24. In self-adjusting gear shifting mechanism, a driven element, a driving shaft mounted for bodily movement laterally by variations in the load resistance, a hydraulic cylinder having a piston moved by said bodily movement, shifting gears, a further cylinder and piston for each shifting gear, means for storing up energy from the movement of said further pistons, and means for releasing said stored up energy at the proper time for shifting said gears, said release means including a bar moved longitudinally by one of the further pistons, and lost motion means between the rod of said last mentioned piston and said bar so as to cause the release at the proper time for shifting the associated gear.

25. In self-adjusting gear shifting mechanism, a driven element, a driving shaft mounted for bodily movement laterally by variations in the load resistance, a hydraulic cylinder having a piston moved by said bodily movement, shifting gears, a further cylinder and piston for each shifting gear, means for storing up energy from the movement of said further pistons, and means for releasing said stored up energy at the proper time for shifting said gears, said release means including a bar moved longitudinally by one of the further pistons, and lost motion means between the rod of said last mentioned piston and said bar so as to cause the release at the proper time for shifting the associated gear, the further pistons each having a two part piston rod, said storing up means being between the parts of said two part piston rod, and latch means associated with the outer part of said two part piston to release said stored up energy at said proper time for shifting the gears.

26. In self-adjusting gear shifting mechanism, a clutch, a movable element, means for causing the load resistance to move said element, further means to retrace said movement upon release of load resistance, means for causing either of said movements to store up energy, means for using said stored up energy for shifting gears, means for throwing out the clutch during gear shifting, and locking means for positively preventing dissipation of said stored up energy while said clutch is out.

27. In self-adjusting ratio changing mechanism, a clutch, a driven element, a driving shaft for driving said driven element and movable by the load resistance from driven element, means to return the driving shaft after load resistance is decreased, ratio changing mechanism, a movable element moved by movement of driving shaft to operate said ratio changing mechanism, means for storage of energy from movement of the drive shaft when transmitted to said movable element, means for controlling release of stored up energy, and co-ordinating operations of ratio changing means to open the clutch at time of ratio changing, locking means to positively hold shifting energy against wasteful loss while the drive is interrupted, and means to lock and unlock the shifting mechanism for individual gears.

28. In ratio changing mechanism, clutch operating mechanism, ratio changing gears, a longitudinally movable drive shaft, means for moving said shaft longitudinally in response to variations in resistance between power and load, a shifting element to change the ratios of the gears, a movable element to transmit the movement of the drive shaft to the shifting element, latching means, means for storing up ratio changing energy under control of the latching means, means operated by the movement of the drive shaft to release the latching means to enable said ratio changing movement when the desired pressure is stored up, said clutch operating mechanism comprising a vacuum powered piston to open the clutch when the gear ratios are to be changed, and means actuated by movement of the drive shaft to lock the gear ratio changing energy against dissipation while the ratio changes are being effected.

29. In ratio changing mechanism, clutch operating mechanism, ratio changing gears, a longitudinally movable drive shaft, means for moving said shaft longitudinally in response to variations in resistance between power and load, a shifting element to change the ratios of the gears, a movable element to transmit the movement of the drive shaft to the shifting element, latching means, means for storing up ratio changing energy under control of the latching means, means operated by the movement of the drive shaft to release the latching means to enable said ratio changing movement when the desired pressure is stored up, and means actuated by movement of the drive shaft to lock the gear ratio changing energy against dissipation while the ratio changes are being effected.

ELWOOD E. SMITH.